(12) United States Patent
Kobayashi

(10) Patent No.: US 8,992,377 B2
(45) Date of Patent: Mar. 31, 2015

(54) CONTROL DEVICE

(75) Inventor: Yasuhiko Kobayashi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 368 days.

(21) Appl. No.: 13/517,275

(22) PCT Filed: Mar. 30, 2011

(86) PCT No.: PCT/JP2011/058091
§ 371 (c)(1),
(2), (4) Date: Jun. 20, 2012

(87) PCT Pub. No.: WO2011/125777
PCT Pub. Date: Oct. 13, 2011

(65) Prior Publication Data
US 2012/0264565 A1    Oct. 18, 2012

(30) Foreign Application Priority Data
Mar. 31, 2010  (JP) .................................. 2010-083054

(51) Int. Cl.
*B60W 10/02* (2006.01)
*B60W 10/08* (2006.01)
(Continued)

(52) U.S. Cl.
CPC . *B60K 6/48* (2013.01); *B60L 11/14* (2013.01);
*B60L 15/2072* (2013.01); *B60W 10/02*
(2013.01); *B60W 10/06* (2013.01); *B60W 10/08*
(2013.01); *B60W 20/00* (2013.01);
(Continued)

(58) Field of Classification Search
USPC .......................................................... 477/5
See application file for complete search history.

(56) References Cited

U.S. PATENT DOCUMENTS 6,581,705 B2   6/2003   Phillips et al.
7,028,795 B2   4/2006   Tabata
(Continued)

FOREIGN PATENT DOCUMENTS

CN        1927612 A        3/2007
JP     A-09-074608         3/1997
(Continued)

OTHER PUBLICATIONS

International Search Report issued in International Application No. PCT/JP2011/058091 (with English translation).
(Continued)

*Primary Examiner* — Jacob S Scott
(74) *Attorney, Agent, or Firm* — Oliff PLC

(57) ABSTRACT

A control device controls a vehicle drive device including an input member connected to and driven by an internal combustion engine; an intermediate member connected to and driven by a rotating electrical machine; an output member connected to and driven by a wheel; a first engagement device provided between the input member and the intermediate member; and the second engagement device provided between the intermediate member and the output member. The rotating electrical machine generates power while the first engagement device is directly engaged, and has a differential rotation control region wherein the first engagement device is moved from direct engagement to slipping engagement and the second engagement device is moved from disengagement to slipping engagement during special takeoff control, which controls the vehicle so as to take off while the second engagement device is disengaged and the rotating electrical machine is generating power.

14 Claims, 9 Drawing Sheets

(51) Int. Cl.
  *B60K 6/48* (2007.10)
  *B60L 11/14* (2006.01)
  *B60L 15/20* (2006.01)
  *B60W 10/06* (2006.01)
  *B60W 30/18* (2012.01)
  *B60W 20/00* (2006.01)

(52) U.S. Cl.
  CPC ....... *B60W30/18027* (2013.01); *Y02T 10/6221* (2013.01); *Y02T 10/6286* (2013.01); *Y02T 10/7077* (2013.01); *B60K 2006/4825* (2013.01); *B60W 2710/025* (2013.01); *Y02T 10/6252* (2013.01)
  USPC ........................................................... 477/5

(56) References Cited

U.S. PATENT DOCUMENTS

| | | | |
|---|---|---|---|
| 7,273,120 | B2 | 9/2007 | Tabata |
| 7,360,616 | B2 | 4/2008 | Schiele |
| 7,395,888 | B2 | 7/2008 | Yamamoto et al. |
| 7,686,112 | B2 | 3/2010 | Shiiba |
| 7,708,095 | B2 | 5/2010 | Hirata |
| 8,498,765 | B2 | 7/2013 | Tajima et al. |
| 2006/0243501 | A1* | 11/2006 | Hidaka .................. 180/65.1 |
| 2006/0247086 | A1 | 11/2006 | Watanabe et al. |
| 2007/0056784 | A1 | 3/2007 | Joe et al. |
| 2007/0278022 | A1 | 12/2007 | Tanishima |
| 2009/0105918 | A1 | 4/2009 | Kobayashi et al. |
| 2009/0143950 | A1 | 6/2009 | Hasegawa et al. |
| 2009/0234524 | A1 | 9/2009 | Kim |
| 2011/0021312 | A1 | 1/2011 | Fukitani |

FOREIGN PATENT DOCUMENTS

| | | |
|---|---|---|
| JP | A-09-238403 | 9/1997 |
| JP | A-11-150805 | 6/1999 |
| JP | A-2000-213386 | 8/2000 |
| JP | A-2006-306325 | 11/2006 |
| JP | A-2006-306328 | 11/2006 |
| JP | A-2007-314097 | 12/2007 |
| JP | A-2008-007094 | 1/2008 |
| JP | A-2008-62688 | 3/2008 |
| JP | A-2008-222222 | 9/2008 |
| JP | A-2009-255876 | 11/2009 |
| JP | A-2010-143306 | 7/2010 |
| JP | A-2010-155590 | 7/2010 |
| JP | A-2010-202151 | 9/2010 |
| JP | A-2011-20542 | 2/2011 |
| JP | A-2011-025811 | 2/2011 |
| JP | A-2011-031659 | 2/2011 |
| JP | A-2011-507746 | 3/2011 |
| JP | A-2012-159105 | 8/2012 |
| WO | WO 2009/074480 A1 | 6/2009 |
| WO | WO 2012/043555 A1 | 4/2012 |

OTHER PUBLICATIONS

International Search Report issued in International Application No. PCT/JP2011/072067 dated Nov. 22, 2011 (w/ translation).
International Search Report issued in International Application No. PCT/JP2011/058089 dated Jun. 28, 2011 (w/translation).
Office Action issued in U.S. Appl. No. 13/240,065 dated Jan. 17, 2013.
Nov. 21, 2013 Japanese Office Action issued in Japanese Application No. 2011-198359 (with partial translation).
Jan. 26, 2015 Office Action issued in U.S. Appl. No. 13/517,421.

\* cited by examiner

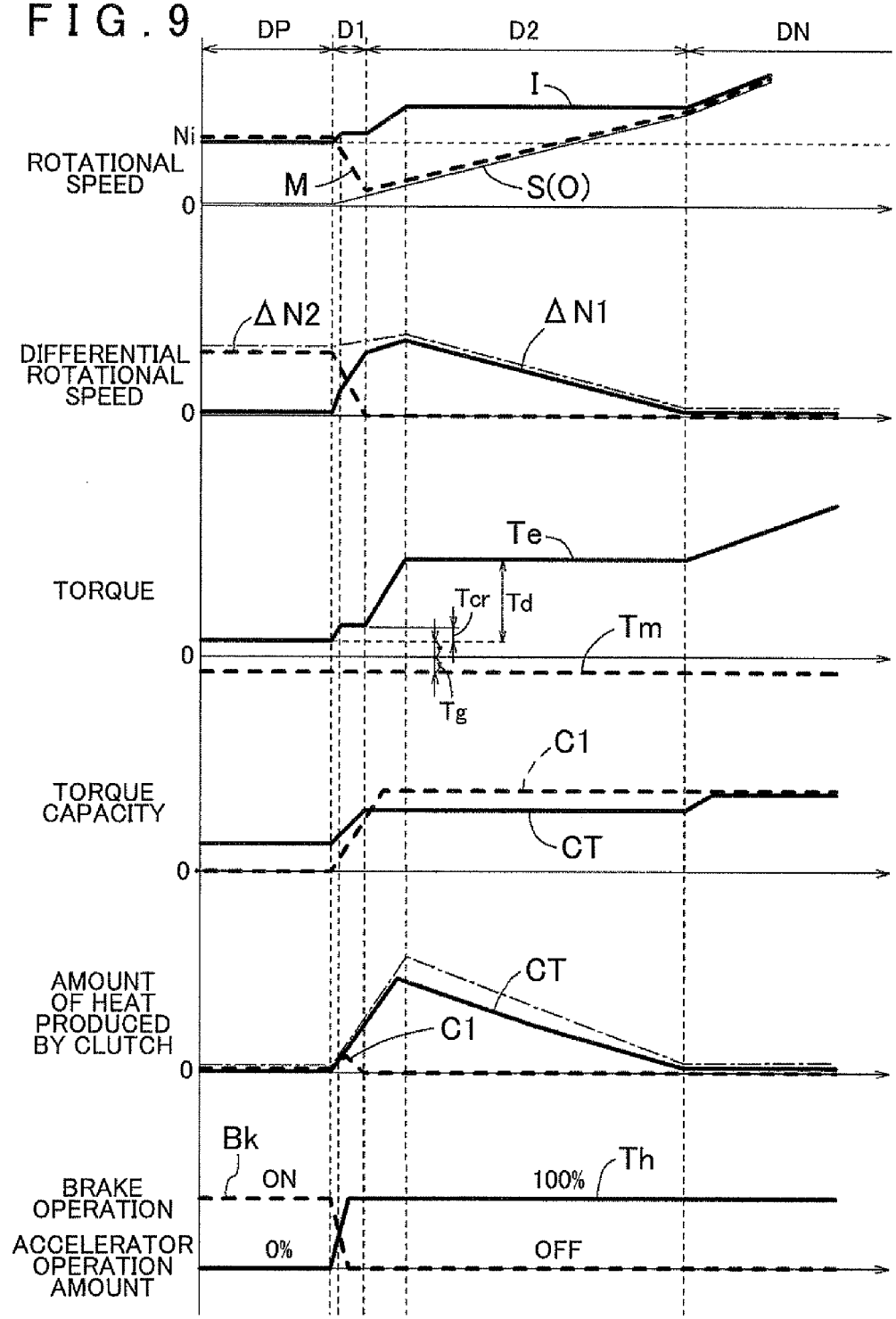

CONTROL DEVICE

INCORPORATION BY REFERENCE

The disclosure of Japanese Patent Application No. 2010-083054 filed on Mar. 31, 2010 including the specification, drawings and abstract is incorporated herein by reference in its entirety.

BACKGROUND OF THE INVENTION

The present invention relates to a control device for a vehicle drive device including an input member drivably coupled to an internal combustion engine, an intermediate member drivably coupled to a rotary electric machine, an output member drivably coupled to wheels, a first engagement device that selectively drivably couples the input member and the intermediate member to each other, and a second engagement device that selectively drivably couples the intermediate member and the output member to each other.

DESCRIPTION OF THE RELATED ART

A device disclosed in Japanese Patent Application Publication No. 2007-314097 (JP 2007-314097 A) mentioned below is already known as an example of the control device for a vehicle drive device described above. Hereinafter, in the description in the "Description of the Related Art" section, reference numerals used in JP 2007-314097 A (and the names of corresponding members as necessary) are cited in brackets for description. The vehicle drive device according to JP 2007-314097 A is formed as a drive device for a so-called one-motor parallel type hybrid vehicle, and includes a first engagement device [first clutch CL1] that selectively drivably couples an internal combustion engine [engine E] and a rotary electric machine [motor generator MG] to each other and a second engagement device [second clutch CL2] that selectively drivably connects a part of a power transfer path connecting between the rotary electric machine [motor generator MG] and wheels [RL, RR].

The control device described in JP 2007-314097 A is configured to establish a plurality of modes including at least an EV travel mode in which the vehicle travels using only torque of the rotary electric machine as a power source with the first engagement device in the disengaged state and with the second engagement device in the completely engaged state, a WSC travel mode in which the vehicle travels using torque of the internal combustion engine as an additional power source with the first engagement device in the completely engaged state and with the second engagement device in the slip engagement state, and an electric power generation mode in which the rotary electric machine is caused to generate electric power using torque of the internal combustion engine with the first engagement device in the completely engaged state and with the second engagement device in the disengaged state. The control device is configured to normally select the WSC travel mode when the vehicle which has been stationary is started.

In starting control performed in the WSC travel mode according to JP 2007-314097 A, the second engagement device slips to produce heat. If the second engagement device produces heat repeatedly, for example, to be overheated, a problem may be caused such as a reduction in durability of the second engagement device. Therefore, the control device described in JP 2007-314097 A selects the electric power generation mode while the vehicle is stationary to cause the rotary electric machine to generate electric power using torque of the internal combustion engine when the temperature of the second engagement device is equal to or more than a predetermined temperature. Then, after a sufficient amount of electric power is accumulated, the first engagement device is disengaged and the second engagement device is completely engaged to start the vehicle in the EV travel mode. This makes it possible to avoid slip of the second engagement device to avoid a reduction in durability of the second engagement device due to overheating.

In the EV travel mode in which the vehicle travels using only torque of the rotary electric machine as a power source with the first engagement device in the disengaged state, however, the rotary electric machine must output torque for driving the vehicle, and therefore may not generate electric power. That is, electric power generation performed by the rotary electric machine in the electric power generation mode is interrupted when the vehicle is started. Hence, a sufficient amount of accumulated electric power may not be secured in the case where the vehicle travels at a low vehicle speed for a long time compared to the time for which the vehicle is stationary, for example.

SUMMARY OF THE INVENTION

Problem to be Solved by the Invention

In view of the foregoing, it is desirable to provide a control device that can start a vehicle while continuing electric power generation which has been performed since the vehicle is stationary and that can suppress a reduction in durability of a second engagement device.

Means for Solving the Problem

A control device according to an aspect of the present invention controls a vehicle drive device including an input member drivably coupled to an internal combustion engine, an intermediate member drivably coupled to a rotary electric machine, an output member drivably coupled to wheels, a first engagement device that selectively drivably couples the input member and the intermediate member to each other, and a second engagement device that selectively drivably couples the intermediate member and the output member to each other. In the control device, a difference in rotational speed between engagement members on both sides of the first engagement device is defined as a first differential rotational speed, and a difference in rotational speed between engagement members on both sides of the second engagement device is defined as a second differential rotational speed; specific starting control in which a vehicle is started with the rotary electric machine continuously generating electric power from a state in which the rotary electric machine generates electric power with the first engagement device providing no first differential rotational speed and in which the second engagement device transfers no drive force is executed; and the specific starting control includes a differential rotational speed control region in which the first engagement device is transitioned from a state in which the first engagement device transfers a drive force while providing no first differential rotational speed to a state in which the first engagement device transfers a drive force while providing the first differential rotational speed, and in which the second engagement device is transitioned from a state in which the second engagement device transfers no drive force to a state in which the second engagement device transfers a drive force while providing the second differential rotational speed.

The term "drivably coupled" as used herein refers to a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain.

The term "rotary electric machine" refers to any of a motor (electric motor), a generator (electric generator), and a motor generator that functions both as a motor and as a generator as necessary.

According to the configuration described above, the rotary electric machine can be maintained in the electric power generating state when the vehicle is started by executing the specific starting control. At this time, in the differential rotational speed control region, the first engagement device is transitioned into a state in which the first engagement device transfers a drive force while providing the first differential rotational speed, and the second engagement device is transitioned into a state in which the second engagement device transfers a drive force while providing the second differential rotational speed. Thus, torque of the internal combustion engine can be transferred to the wheels side via the first engagement device and the second engagement device. Hence, the vehicle can be started with the rotary electric machine continuously maintained in the electric power generating state.

In the configuration described above, in addition, the second differential rotational speed of the second engagement device can be decreased to reduce the amount of slip of the second engagement device by increasing the first differential rotational speed of the first engagement device during execution of the specific starting control, compared to a case where the first engagement device is maintained in a state in which the first engagement device transfers a drive force while providing no first differential rotational speed. Hence, it is possible to suppress overheating of the second engagement device by reducing the amount of heat produced by the second engagement device, to suppress a reduction in durability of the second engagement device.

Thus, a control device that can start a vehicle while continuing electric power generation which has been performed since the vehicle is stationary and that can suppress a reduction in durability of a second engagement device can be provided.

In the configuration described above, defining the differential rotational speed control region as a first control region, the specific starting control may further include a second control region which is provided after the first control region and in which the first engagement device is transitioned from a state in which the first engagement device transfers a drive force while providing the first differential rotational speed to a state in which the first engagement device transfers a drive force while providing no first differential rotational speed along with a rise in rotational speed of the output member with the second engagement device providing no second differential rotational speed.

In this configuration, the first differential rotational speed can be gradually decreased along with a rise in rotational speed of the output member in the second control region provided after the first control region. Hence, it is possible to suppress overheating of the first engagement device to suppress a reduction in durability of the first engagement device.

In addition, it is possible to ensure that large torque is transferred from the internal combustion engine to the wheels side via the first engagement device.

In the configuration described above, the specific starting control may further include a third control region which is provided between the first control region and the second control region and in which a rotational speed of the intermediate member is maintained at a predetermined value with the rotational speed of the output member rising to gradually decrease the second differential rotational speed.

In this configuration, by maintaining the rotational speed of the intermediate member at a predetermined value with the rotational speed of the output member rising in the third control region, rotation of the intermediate member is not turned from decrease to increase before and after the time point when the second differential rotational speed is eliminated, in contrast to a case where the second differential rotational speed is decreased until the second differential rotational speed is eliminated in the first control region, for example. Hence, abrupt fluctuations in rotational speed of the intermediate member can be suppressed. Thus, it is possible to suppress transfer of abrupt fluctuations in rotational speed of the intermediate member to the output member and the wheels via the second engagement device, to suppress generation of a shock at the time point when the second differential rotational speed is eliminated.

In the configuration described above, the vehicle drive device may further include an oil pump drivably coupled to the intermediate member to generate, in an actuated state, a supply hydraulic pressure for the first engagement device and the second engagement device, and the rotary electric machine may be controlled in the third control region such that the rotational speed of the intermediate member reaches a rotational speed at which the oil pump can secure a supply hydraulic pressure required for both the first engagement device and the second engagement device.

In this configuration, by maintaining the rotational speed of the intermediate member at a predetermined value with the rotational speed of the output member rising in the third control region, it is possible to suppress generation of a shock at the time point when the second differential rotational speed is eliminated in the same manner as described above.

In this configuration, in addition, with the rotational speed of the intermediate member maintained at a predetermined value, the oil pump drivably coupled to the intermediate member which rotates at the predetermined rotational speed can secure a supply hydraulic pressure required for both the first engagement device and the second engagement device. Hence, it is no longer necessary to provide the vehicle drive device to be controlled with an additional hydraulic pressure source that can be actuated independently of drive force sources for the vehicle, such as an electric oil pump, for example. Thus, such an additional hydraulic pressure source can be omitted to reduce the manufacturing cost of the vehicle drive device.

In the configuration described above, the specific starting control may further include a fourth control region which is provided between the first control region and the third control region and in which, with the rotational speed of the output member rising, the rotational speed of the intermediate member is raised in accordance with the rise in rotational speed of the output member to maintain the second differential rotational speed at a predetermined target differential rotational speed.

In this configuration, the second differential rotational speed is temporarily maintained at a predetermined target differential rotational speed in the fourth control region before the rotational speed of the intermediate member is maintained at a predetermined value in the third control region. Thus, the second differential rotational speed can be reduced quickly compared to a case where a transition is made directly from the first control region to the third control region, for example. Hence, by providing the fourth control region before the third control region, it is possible to suppress generation of a shock at the time point when the second differential rotational speed is eliminated while favorably suppressing a reduction in durability of the second engagement device by effectively reducing the amount of heat produced by the second engagement device.

As the value of the "target differential rotational speed" in this case, a predetermined constant value, a value determined as a function of the rotational speed of an engagement member provided on the downstream side of the second engagement device in the power transfer path connecting between the intermediate member and the output member, and so forth may be adopted.

In the configuration described above, the second engagement device may be transitioned in the differential rotational speed control region from a state in which the second engagement device transfers no drive force to a state in which the second engagement device transfers a drive force while providing the second differential rotational speed and further to a state in which the second engagement device transfers a drive force while providing no second differential rotational speed.

In this configuration, the second engagement device is transitioned into a state in which the second engagement device transfers a drive force while providing the second differential rotational speed in the first control region. Thus, the second differential rotational speed can be eliminated relatively rapidly in the case where the time for the first control region is set to be constant, for example. Hence, it is possible to more effectively reduce the amount of heat produced by the second engagement device to more effectively suppress a reduction in durability of the second engagement device.

In the configuration described above, the specific starting control may include a control region in which the supply hydraulic pressure for the first engagement device is controlled such that the first differential rotational speed reaches a predetermined magnitude, the rotary electric machine is controlled to a rotational speed matching a target rotational speed decided on the basis of a required amount of generated electric power, the supply hydraulic pressure for the second engagement device is controlled such that torque transferred to the output member matches a required drive force required to drive the vehicle, and an internal combustion engine control command for causing the internal combustion engine to output torque matching a sum of electric power generation torque, which is provided to the rotary electric machine to generate the required amount of electric power, and the required drive force is output to an internal combustion engine control section.

In this configuration, by outputting a predetermined internal combustion engine control command to the internal combustion engine control section and controlling the supply hydraulic pressure for the first engagement device, it is possible to appropriately transfer torque matching the sum of the electric power generation torque for generating the required amount of electric power and the required drive force from the internal combustion engine side to the rotary electric machine side via the first engagement device. In addition, by controlling the rotary electric machine such that the rotational speed of the rotary electric machine matches a predetermined target rotational speed, it is possible to appropriately secure the amount of generated electric power corresponding to the required amount of generated electric power. Further, by controlling the supply hydraulic pressure for the second engagement device, it is possible to transfer torque matching the required drive force to the output member to appropriately drive the vehicle.

In any of the configurations described so far, the supply hydraulic pressure for the second engagement device may be controlled during the specific starting control so as to vary the first differential rotational speed and the second differential rotational speed in a desired manner.

In this configuration, by controlling the supply hydraulic pressure for the second engagement device, it is possible to appropriately vary the first differential rotational speed and the second differential rotational speed to vary the respective states of the first engagement device and the second engagement device in the manner described so far in each of the control regions.

Operation control of the internal combustion engine and the rotary electric machine may be performed so as to transfer drive torque corresponding to the required drive force for driving the vehicle to the wheels, and the supply hydraulic pressure for the first engagement device may be controlled so as to maintain the rotational speed of the input member at a predetermined rotational speed with the internal combustion engine outputting a portion of the drive torque to be carried by the internal combustion engine.

In this configuration, torque corresponding to the rotational speed of the internal combustion engine, which rotates together with the input member, up to the portion of the drive torque to be carried by the internal combustion engine can be transferred from the internal combustion engine side to the wheels side via the first engagement device. Hence, by performing such control on the supply hydraulic pressure for the first engagement device, it is possible to transfer torque with an appropriate magnitude to the wheels side via the first engagement device.

From such a viewpoint, the "predetermined rotational speed" is preferably set to a rotational speed required for the internal combustion engine to output the portion of the drive torque to be carried by the internal combustion engine.

Alternatively, operation control of the internal combustion engine and the rotary electric machine may be performed so as to transfer drive torque corresponding to the required drive force for driving the vehicle to the wheels, and the supply hydraulic pressure for the first engagement device may be controlled such that a transfer torque capacity of the first engagement device reaches a value equivalent to a portion of the drive torque to be carried by the internal combustion engine.

In this configuration, torque corresponding to the transfer torque capacity of the first engagement device up to the portion of the drive torque to be carried by the internal combustion engine output from the internal combustion engine can be transferred from the internal combustion engine side to the wheels side via the first engagement device. Hence, by controlling the supply hydraulic pressure for the first engagement device in this way, it is possible to appropriately transfer the portion of the drive torque to be carried by the internal combustion engine to the wheels side via the first engagement device. This allows the vehicle to appropriately travel.

In the configuration described above, operation control of the internal combustion engine and the rotary electric machine may be performed so as to transfer creep torque for causing the vehicle to creep to the wheels, and the supply hydraulic pressure for the first engagement device may be controlled such that the transfer torque capacity of the first engagement device reaches a value equivalent to a portion of the creep torque to be carried by the internal combustion engine.

In this configuration, torque corresponding to the transfer torque capacity of the first engagement device up to the portion of the creep torque to be carried by the internal combustion engine output from the internal combustion engine can be transferred from the internal combustion engine side to the wheels side via the first engagement device. Hence, by controlling the supply hydraulic pressure for the first engagement device in this way, it is possible to appropriately transfer the portion of the creep torque to be carried by the internal combustion engine to the wheels side via the first engagement device. This allows the vehicle to appropriately creep.

In this configuration, in addition, the upper limit value of torque transferred to the wheels side via the second engagement device is equal to the creep torque set to a relatively small value. The amount of heat produced by an engagement device is proportional to the product of the magnitude of torque transferred via the engagement device and the differential rotational speed of the engagement device. Therefore, by adopting the configuration described above, the amount of heat produced by the second engagement device can be reduced. Hence, it is possible to effectively suppress overheating of the second engagement device to effectively suppress a reduction in durability of the second engagement device.

In any of the configurations described so far, the vehicle drive device may further include a speed change mechanism provided between the intermediate member and the output member and including a plurality of engagement devices including a starting engagement device that, in an engaged state, establishes a starting shift speed, and the control device may control the vehicle drive device in which the starting engagement device serves as the second engagement device.

In the starting engagement device provided in the speed change mechanism and brought into the engaged state to establish the starting shift speed, the rotational speed of an engagement member on the downstream side of the second engagement device in the power transfer path connecting between the intermediate member and the output member tends to rise at a gentle speed in proportion to the vehicle speed (the rotational speed of the output member) at the time when the vehicle is started. Therefore, the second differential rotational speed tends to become relatively large to also make the amount of heat produced by the second engagement device large, irrespective of how the rotational speed of an engagement member on the upstream side of the second engagement device in the power transfer path described above is varied.

In this configuration, it is possible to start the vehicle with the rotary electric machine continuously maintained in the electric power generating state since the vehicle is stationary while appropriately protecting the starting engagement device of the speed change mechanism, which tends to produce a large amount of heat and thus the durability of which tends to be reduced by overheating.

BRIEF DESCRIPTION OF THE DRAWINGS

FIG. 9 is a time chart showing the operating states of various components during specific starting control according to a fifth embodiment.

DETAILED DESCRIPTION OF THE EMBODIMENTS

1. First Embodiment

Figure 1:
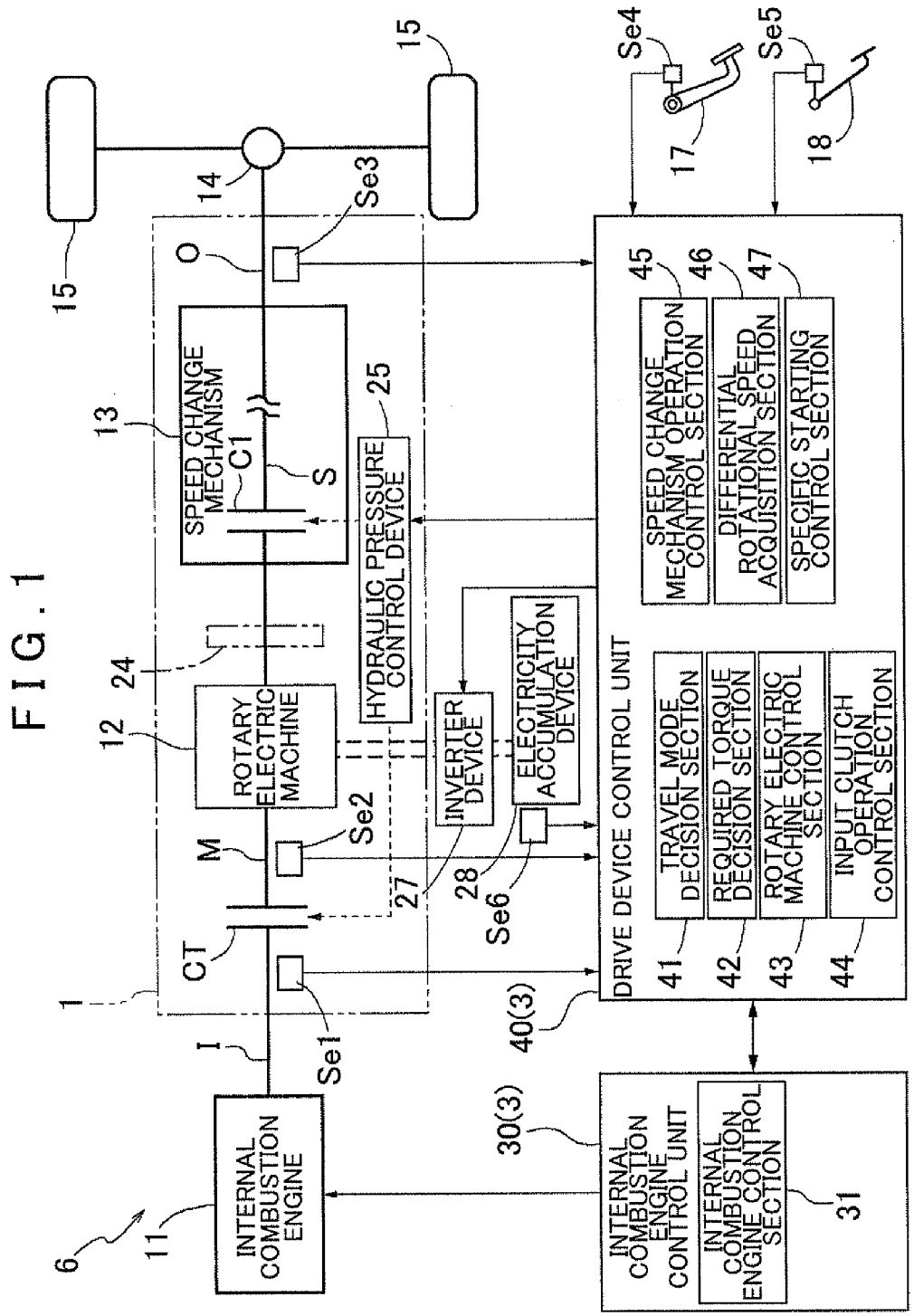
FIG. 1 is a schematic diagram showing a schematic configuration of a vehicle drive device and a control device for the vehicle drive device according to a first embodiment.

A control device according to a first embodiment of the present invention will be described with reference to the drawings. A control device 3 according to the present embodiment is a drive device control device that controls a drive device 1. Here, the drive device 1 according to the present embodiment is a drive device (hybrid vehicle drive device) that drives a vehicle (hybrid vehicle) in which one or both of an internal combustion engine 11 and a rotary electric machine 12 are used as drive force sources for wheels 15 of a vehicle 6. The drive device 1 is formed as a drive device for a so-called one-motor parallel type hybrid vehicle.

As shown in FIG. 1, the drive device 1 according to the present embodiment includes an input shaft I drivably coupled to the internal combustion engine 11, an intermediate shaft M drivably coupled to the rotary electric machine 12, an output shaft O drivably coupled to the wheels 15, an input clutch CT that selectively drivably couples the input shaft I and the intermediate shaft M to each other, and a first clutch C1 that selectively drivably couples the intermediate shaft M and the output shaft O to each other. The thus configured drive device 1 according to the present embodiment is characterized in content of control for various components including the input clutch CT, the first clutch C1, and the rotary electric machine 12 performed when the vehicle 6 is started under predetermined conditions. The drive device 1 according to the present embodiment will be described in detail below.

1-1. Configuration of Drive Train of Drive Device

First, the overall configuration of the drive device 1 according to the present embodiment will be described. As shown in FIG. 1, the drive device 1 includes the input shaft I drivably coupled to the internal combustion engine 11 serving as a first drive force source for the vehicle 6, the rotary electric machine 12 serving as a second drive force source for the vehicle 6, the intermediate shaft M drivably coupled to the rotary electric machine 12, a speed change mechanism 13, and the output shaft O drivably coupled to the wheels 15. These components are housed in a case (drive device case). In the present embodiment, the input shaft I corresponds to the "input member" according to the present invention, and the intermediate shaft M corresponds to the "intermediate member" according to the present invention. In addition, the output shaft O corresponds to the "output member" according to the present invention. The input shaft I, the intermediate shaft M, and the output shaft O are disposed coaxially with each other.

The internal combustion engine 11 is a device driven by combusting fuel inside the engine to take out power. Various engines known in the art such as a gasoline engine and a diesel engine, for example, may be used as the internal combustion engine 11. The internal combustion engine 11 is drivably coupled to the input shaft I so as rotate together with the input shaft I. In the example, an internal combustion engine output shaft, such as a crankshaft of the internal combustion engine 11, is drivably coupled to the input shaft I. It is also suitable that the internal combustion engine 11 is drivably coupled between the internal combustion engine output shaft and the input shaft I via a damper or other devices. The internal combustion engine 11 is drivably coupled to the rotary electric machine 12 via the input clutch CT.

The input clutch CT is a friction engagement device provided between the internal combustion engine 11 and the rotary electric machine 12 and capable of switching on and off transfer of a drive force between the internal combustion engine 11 and the rotary electric machine 12. In the present embodiment, the input clutch CT is provided to selectively drivably couple the input shaft I and the intermediate shaft M to each other. In the present embodiment, in addition, a transfer torque capacity Tct of the input clutch CT can be continuously controlled so as to increase and decrease by controlling the supply hydraulic pressure for the input clutch CT. A wet multi-plate clutch or a dry single-plate clutch, for example, may be suitably used as the clutch. In the present embodiment, the input clutch CT corresponds to the "first engagement device" according to the present invention.

The rotary electric machine 12 includes a rotor and a stator (not shown), and can function both as a motor (electric motor) that is supplied with electric power to generate power and as a generator (electric generator) that is supplied with power to generate electric power. The rotor of the rotary electric machine 12 is drivably coupled to the intermediate shaft M so as to rotate together with the intermediate shaft M. In addition, the rotary electric machine 12 is electrically connected to an electricity accumulation device 28 via an inverter device 27. In the example, a battery is used as the electricity accumulation device 28. A capacitor or the like may also be suitably used as the electricity accumulation device 28. The rotary electric machine 12 receives electric power supplied from the electricity accumulation device 28 for power running, or supplies electric power generated using torque output from the internal combustion engine E or an inertial force of the vehicle 6 to the electricity accumulation device 28 to accumulate the electric power in the electricity accumulation device 28. The intermediate shaft M, which rotates together with the rotor of the rotary electric machine 12, is drivably coupled to the speed change mechanism 13. That is, the intermediate shaft M serves as an input shaft (transmission input shaft) of the speed change mechanism 13.

The speed change mechanism 13 is a stepped automatic transmission that provides a plurality of shift speeds with different speed ratios. In order to provide the plurality of shift speeds, the speed change mechanism 13 includes one or two or more gear mechanisms, such as planetary gear mechanisms, and a plurality of engagement devices (in the example, friction engagement devices), such as clutches and brakes, that engage and disengage rotary elements of the gear mechanisms to switch between the shift speeds. Here, in the present embodiment, the speed change mechanism 13 includes the first clutch C1 serving as one of the plurality of friction engagement devices. The first clutch C1 is provided to selectively drivably couple the intermediate shaft M and a transmission intimidate shaft S provided in the speed change mechanism 13 to each other. The transmission intermediate shaft S is drivably coupled to the output shaft O via other engagement devices or a shaft member in the speed change mechanism 13. In this way, the first clutch C1 is provided to selectively drivably couple the intermediate shaft M and the transmission intermediate shaft S, which form a part of the power transfer path connecting between the intermediate shaft M and the output shaft O, to each other. In other words, the first clutch C1 provided between the rotary electric machine 12 and the wheels 15 is capable of switching on and off transfer of a drive force between the rotary electric machine 12 and the wheels 15. In the present embodiment, the first clutch C1 corresponds to the "second engagement device" according to the present invention.

In the present embodiment, a transfer torque capacity Tc1 of the first clutch C1 can be continuously controlled so as to increase and decrease by controlling the supply hydraulic pressure for the first clutch C1. A wet multi-plate clutch, for example, may be suitably used as the clutch. In the present embodiment, in addition, a first speed, of the plurality of shift speeds, is established with the first clutch C1 shown in FIG. 1 and a one-way clutch (not shown) in the engaged state. When the vehicle 6 which has been stationary is started, the first speed is established as a starting shift speed. Thus, in the present embodiment, the first clutch C1 serving as the second engagement device functions as the "starting engagement device" according to the present invention.

The speed change mechanism 13 transfers rotation and torque of the intermediate shaft M to the output shaft O with the speed of the rotation changed with a predetermined speed ratio set for each shift speed and with the torque converted. The torque transferred from the speed change mechanism 13 to the output shaft O is distributed and transferred to the two, left and right, wheels 15 via an output differential gear device 14. This causes the vehicle 6 to travel.

In the present embodiment, the drive device 1 includes an oil pump 24 drivably coupled to the intermediate shaft M. The oil pump 24 functions as a hydraulic pressure source that sucks oil accumulated in an oil pan (not shown) to supply the oil to various components of the drive device 1. The oil pump 24 is a mechanical oil pump mechanically drivably coupled at least to the rotary electric machine 12 serving as the second drive force source for the vehicle 6 via the intermediate shaft M. A gear pump, a vane pump, or the like, for example, may be suitably used as the oil pump 24. The oil pump 24 discharges oil to generate a hydraulic pressure in an actuated state in which the oil pump 24 is actuated by being driven by a drive force of one or both of the rotary electric machine 12 and the internal combustion engine 11 transmitted via the intermediate shaft M. The pressurized oil discharged by the oil pump 24 is regulated to a predetermined hydraulic pressure by a hydraulic pressure control device 25 to be supplied to a plurality of friction engagement devices such as the input clutch CT, the first clutch C1 provided in the speed change mechanism 13, and so forth.

In the present embodiment, the drive device 1 includes an electric oil pump (not shown) that may be actuated irrespective of the drive force of the internal combustion engine 11 and the rotary electric machine 12 serving as drive force sources for the vehicle 6. The electric oil pump includes an electric motor serving as a dedicated drive force source, and may be actuated independently of the oil pump 24. The electric oil pump may be actuated to supplement the discharge capability of the oil pump 24 in the case where a sufficient hydraulic pressure may not be obtained using only oil discharged by the oil pump 24 while the vehicle 6 is stationary, for example.

1-2. Configuration of Control Device

Next, the configuration of the control device 3 which controls the drive device 1 according to the present embodiment will be described. As shown in FIG. 1, the control device 3 includes an internal combustion engine control unit 30 that mainly controls the internal combustion engine 11, and a drive device control unit 40 that mainly controls the rotary electric machine 12, the input clutch CT, and the speed change mechanism 13. The internal combustion engine control unit 30 and the drive device control unit 40 function as a core member that performs operation control of various components of the drive device 1.

The internal combustion engine control unit 30 and the drive device control unit 40 each include an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth (not shown). Various functional sections of the internal combustion engine control unit 30 and the drive device control unit 40 are formed by software (a program) stored in the ROM or the like, hardware such as a separately provided arithmetic circuit, or a combination of both. The functional sections are configured to exchange information between each other. Further, the internal combustion engine control unit 30 and the drive device control unit 40 are configured to exchange information between each other.

As shown in FIG. 1, the control device 3 is configured to be able to acquire information from a plurality of sensors provided at various locations in the drive device 1 and the vehicle 6, specifically an input shaft rotational speed sensor Se1, an intermediate shaft rotational speed sensor Se2, a vehicle speed sensor Se3, an accelerator operation amount detection sensor Se4, a brake pedal operation detection sensor Se5, and a charge state detection sensor Se6. The input shaft rotational speed sensor Se1 is a sensor that detects the rotational speed of the input shaft I. Here, the output shaft of the internal combustion engine 11 (internal combustion engine output shaft) is integrally drivably coupled to the input shaft I. Thus, the rotational speed of the input shaft I detected by the input shaft rotational speed sensor Se1 is equal to the rotational speed of the internal combustion engine 11. The intermediate shaft rotational speed sensor Se2 is a sensor that detects the rotational speed of the intermediate shaft M. Here, the rotor of the rotary electric machine 12 is integrally drivably coupled to the intermediate shaft M. Thus, the rotational speed of the intermediate shaft M detected by the intermediate shaft rotational speed sensor Se2 is equal to the rotational speed of the rotary electric machine 12. The vehicle speed sensor Se3 is a sensor that detects the vehicle speed. In the present embodiment, the vehicle speed sensor Se3 detects the rotational speed of the output shaft O to detect the vehicle speed. The accelerator operation amount detection sensor Se4 is a sensor that detects the amount of operation of an accelerator pedal 17 to detect the accelerator operation amount. The brake operation detection sensor Se5 is a sensor that detects the presence or absence of an operation of a brake pedal 18. The charge state detection sensor Se6 is a sensor that detects SOC (state of charge) to detect the amount of electric power accumulated in the electricity accumulation device 28. Information indicating the results of detection performed by the sensors Se1 to Se6 is output to the internal combustion engine control unit 30 and the drive device control unit 40.

The internal combustion engine control unit 30 includes an internal combustion engine control section 31.

The internal combustion engine control section 31 is a functional section that performs operation control of the internal combustion engine 11, and functions as internal combustion engine control means. The internal combustion engine control section 31 decides control targets for output torque (internal combustion engine torque Te) and the rotational speed of the internal combustion engine 11 and drives the internal combustion engine 11 in accordance with the control targets to perform operation control of the internal combustion engine 11. In the present embodiment, a required torque decision section 42 to be discussed later decides vehicle required torque Td and internal combustion engine required torque which is a portion of the vehicle required torque Td to be carried by the internal combustion engine 11. The internal combustion engine control section 31 controls internal combustion engine torque Te on the basis of the internal combustion engine required torque. The internal combustion engine control section 31 further performs a part of specific starting control in accordance with a command from a specific starting control section 47 to be discussed later.

The drive device control unit 40 includes a travel mode decision section 41, the required torque decision section 42, a rotary electric machine control section 43, an input clutch operation control section 44, a speed change mechanism operation control section 45, a differential rotational speed acquisition section 46, and the specific starting control section 47.

The travel mode decision section 41 is a functional section that decides the travel mode of the vehicle 6, and functions as travel mode decision means. The travel mode decision section 41 decides the travel mode to be established by the drive device 1 on the basis of, for example, the vehicle speed detected by the vehicle speed sensor Se3, the accelerator operation amount detected by the accelerator operation amount detection sensor Se4, the amount of electric power accumulated in the electricity accumulation device 28 detected by the charge state detection sensor Se6, and so forth. In this event, the travel mode decision section 41 references a map (not shown) stored in a storage medium such as a memory and defining the relationship between the vehicle speed, the accelerator operation amount, and the accumulated electric power amount and the travel mode.

When the vehicle 6 is traveling normally, for example, a parallel mode is selected. In the parallel mode, the input clutch CT is brought into the completely engaged state, and the vehicle 6 is driven with at least the internal combustion engine torque Te transferred to the wheels 15 via the output shaft O. The rotary electric machine 12 receives electric power supplied from the electricity accumulation device 28 and outputs rotary electric machine torque Tm to supplement a drive force based on the internal combustion engine torque Te, or generates electric power using a part of the internal combustion engine torque Te to charge the electricity accumulation device 28, as necessary. When the vehicle 6 is stationary, for example, an electric power generation mode may be selected depending on the amount of electric power accumulated in the electricity accumulation device 28. In the electric power generation mode, the input clutch CT is brought into the completely engaged state and all the engagement devices in the speed change mechanism 13, including the first clutch C1, are brought into the disengaged state so that the rotary electric machine 12 generates electric power using the internal combustion engine torque Te output from the internal combustion engine 11 with transfer of a drive force between the rotary electric machine 12 and the wheels 15 blocked. When the vehicle is started from a state in which the rotary electric machine 12 generates electric power and the input clutch CT is in the completely engaged state, such as when the vehicle is started from the electric power generation mode, for example, a specific starting mode is selected. In the specific starting mode, the input clutch CT and the first clutch C1 serving as a starting engagement device are at least controlled to the slip engagement state to start the vehicle 6 using the internal combustion engine torque Te as an additional drive force source. In this event, the rotary electric machine 12 is maintained in the electric power generating state. The present invention is characterized in operation control of various components of the vehicle 6 performed when the vehicle is started in the specific starting mode. This will be discussed later. The modes described here are exemplary, and other modes such as an electric power travel mode, in which the vehicle 6 is driven using only the rotary electric machine torque Tm with the input clutch CT in the disengaged state, for example, can also be selected.

The required torque decision section 42 is a functional section that decides the vehicle required torque Td required to drive the vehicle 6, and functions as required torque decision means. The required torque decision section 42 decides the vehicle required torque Td on the basis of the vehicle speed detected by the vehicle speed sensor Se3 and the accelerator operation amount detected by the accelerator operation amount detection sensor Se4. In the present embodiment, in addition, the required torque decision section 42 also functions to decide the internal combustion engine required torque, which is a portion of the vehicle required torque Td to be carried by the internal combustion engine 11, and rotary electric machine required torque, which is a portion of the vehicle required torque Td to be carried by the rotary electric machine 12, on the basis of the vehicle required torque Td, travel states such as vehicle speed and acceleration/deceleration, vehicle states such as the amount of electric power accumulated in the electricity accumulation device 28, and so forth. The internal combustion engine required torque decided by the required torque decision section 42 is output to the internal combustion engine control section 31 of the internal combustion engine control unit 30 as an internal combustion engine control command. Thus, in the present embodiment, the required torque decision section 42 also functions as an internal combustion engine control command output section. The rotary electric machine required torque is output to the rotary electric machine control section 43 of the drive device control unit 40.

The rotary electric machine control section 43 is a functional section that performs operation control of the rotary electric machine 12, and functions as rotary electric machine control means. The rotary electric machine control section 43 decides control targets for output torque (rotary electric machine torque Tm) and the rotational speed of the rotary electric machine 12 and drives the rotary electric machine 12 in accordance with the control targets to perform operation control of the rotary electric machine 12. Here, the required torque decision section 42 decides the vehicle required torque Td and the rotary electric machine required torque which is a portion of the vehicle required torque Td to be carried by the rotary electric machine 12. The rotary electric machine control section 43 controls the rotary electric machine torque Tm on the basis of the rotary electric machine required torque. Consequently, operation of the internal combustion engine 11 and the rotary electric machine 12 is controlled through cooperation between the rotary electric machine control section 43 and the internal combustion engine control section 31 such that the drive torque for the vehicle 6, which is obtained as the sum of the internal combustion engine torque Te and the rotary electric machine torque Tm, becomes equal to the vehicle required torque Td (see FIG. 2). In this way, the vehicle required torque Td is achieved appropriately. The same holds true for the case where predetermined creep torque Tcr is transferred to the wheels 15 side to drive the vehicle at a low vehicle speed equal to or less than a predetermined vehicle speed (see FIG. 9).

In addition, the rotary electric machine control section 43 can cause the rotary electric machine 12 which is supplied with power to generate electric power by causing the rotary electric machine 12 to output negative rotary electric machine torque Tm (<0). That is, the rotary electric machine 12 basically rotates in the forward direction when the vehicle 6 travels forward, and therefore outputs negative rotary electric machine torque Tm (<0) while rotating in the forward direction to generate electric power. In the present embodiment, as discussed above, the rotary electric machine 12 is caused to generate electric power using the internal combustion engine torque Te in, for example, the electric power generation mode, the specific starting mode, or the like. Torque for causing the rotary electric machine 12 to generate electric power is referred to as "electric power generation torque Tg". The electric power generation torque Tg matches the absolute value of the negative rotary electric machine torque Tm (<0). The rotary electric machine control section 43 further performs a part of the specific starting control in accordance with a command from the specific starting control section 47 to be discussed later.

The input clutch operation control section 44 is a functional section that controls an operation of the input clutch CT, and functions as input clutch operation control means (first engagement device operation control means). Here, the input clutch operation control section 44 controls the hydraulic pressure to be supplied to the input clutch CT via the hydraulic pressure control device 25 to control an operation of the input clutch CT.

In the following description, when used in relation to the state of an engagement device including the input clutch CT, the term "disengaged state" refers to a state in which no rotation or drive force is transferred between engagement members on both sides of the engagement device. The term "slip engagement state" refers to a state in which engagement members on both sides of the engagement device are engaged with each other with a differential rotational speed so as to transfer a drive force between each other. The term "directly engaged state" refers to a state in which engagement members on both sides of the engagement device are engaged with each other so as to rotate together with each other. The term "completely engaged state" refers to a state in which engagement members on both sides of the engagement device are steadily engaged with each other so as to rotate together with each other. The term "engagement pressure" refers to a pressure at which an engagement member on one side and an engagement member on the other side are pressed against each other. The term "disengagement pressure" refers to a pressure at which the engagement device is steadily brought into the disengaged state. The term "disengagement boundary pressure" refers to a pressure (disengagement-side slip boundary pressure) at which the engagement device is brought into a slip boundary state between the disengaged state and the slip engagement state. The term "engagement boundary pressure" refers to a pressure (engagement-side slip boundary pressure) at which the engagement device is brought into a slip boundary state between the slip engagement state and the directly engaged state. The term "complete engagement pressure"

refers to a pressure at which the engagement device is steadily brought into the directly engaged state.

For example, the input clutch operation control section 44 adjusts the hydraulic pressure to be supplied to the input clutch CT to a disengagement pressure less than the disengagement boundary pressure (a so-called stroke end pressure) to bring the input clutch CT into the disengaged state. When the input clutch CT is in the disengaged state, transfer of a drive force between the internal combustion engine 11 and the input shaft I and the rotary electric machine 12 and the intermediate shaft M is blocked. That is, when the input clutch CT is in the disengaged state, the input clutch CT is brought into a state in which the input clutch CT transfers no drive force. In addition, the input clutch operation control section 44 adjusts the hydraulic pressure to be supplied to the input clutch CT to a pressure equal to or more than the engagement boundary pressure to bring the input clutch CT into the directly engaged state, and further adjusts the hydraulic pressure to be supplied to the input clutch CT to the complete engagement pressure to bring the input clutch CT into the completely engaged state. When the input clutch CT is in the directly engaged state (including the completely engaged state), the internal combustion engine 11 and the input shaft I rotate together with the rotary electric machine 12 and the intermediate shaft M to allow transfer of a drive force therebetween. That is, when the input clutch CT is in the directly engaged state, the input clutch CT is brought into a state in which the input clutch CT transfers a drive force while providing no first differential rotational speed $\Delta N1$ to be discussed later.

Moreover, the input clutch operation control section 44 brings the input clutch CT into the slip engagement state (partially engaged state) by adjusting the hydraulic pressure to be supplied to the input clutch CT to a pressure more than the disengagement boundary pressure and less than the complete engagement pressure (specifically, to a slip engagement pressure equal to or more than the disengagement boundary pressure and less than the engagement boundary pressure) with sufficiently large torque transferred to the input clutch CT, for example. Here, the slip engagement state is a state between the disengaged state and the directly engaged state that occurs after the start of engagement and before the establishment of direct engagement. When the input clutch CT is in the slip engagement state, the internal combustion engine 11 and the input shaft I rotate relative to the rotary electric machine 12 and the intermediate shaft M to allow transfer of a drive force therebetween. That is, when the input clutch CT is in the slip engagement state, torque can be transferred while allowing the input clutch CT to slip. When the input clutch CT is in the slip engagement state, the input clutch CT is brought into a state in which the input clutch CT transfers a drive force while providing the first differential rotational speed $\Delta N1$.

The magnitude of torque that can be transferred by the input clutch CT in the completely engaged state or the slip engagement state is determined in accordance with the engagement pressure of the input clutch CT at the time point. The magnitude of torque at the time point is defined as "transfer torque capacity Tct" of the input clutch CT. That is, torque up to the transfer torque capacity Tct of the input clutch CT at the time point is transferred between the internal combustion engine 11 and the rotary electric machine 12 via the input clutch CT. In the present embodiment, as described above, the transfer torque capacity Tct can be continuously controlled so as to increase and decrease. The direction of torque transferred via the input clutch CT with the input clutch CT in the slip engagement state is determined in accordance with the direction of relative rotation between the input shaft I and the intermediate shaft M. The input clutch operation control section 44 further performs a part of the specific starting control in accordance with a command from the specific starting control section 47 to be discussed later.

The speed change mechanism operation control section 45 is a functional section that controls an operation of the speed change mechanism 13, and functions as speed change mechanism operation control means. The speed change mechanism operation control section 45 decides a target shift speed on the basis of the accelerator operation amount and the vehicle speed of the vehicle 6, and controls the speed change mechanism 13 so as to establish the decided target shift speed. The drive device control unit 40 stores in a memory or the like (not shown) a predetermined shift map in which schedules for shifting are set on the basis of the accelerator operation amount and the vehicle speed. The speed change mechanism operation control section 45 decides the target shift speed to be established in the speed change mechanism 13 at each time point on the basis of the shift map and the accelerator operation amount and the vehicle speed of the vehicle 6. Then, the speed change mechanism operation control section 45 supplies a hydraulic pressure to a predetermined friction engagement device provided in the speed change mechanism 13 via the hydraulic pressure control device 25 on the basis of the decided target shift speed to bring the engagement device into the engaged state to establish the target shift speed. In the case where the decided target shift speed is changed, the speed change mechanism operation control section 45 interchanges the respective engagement states of two predetermined engagement devices to switch the shift speed to be established.

As described above, the speed change mechanism 13 includes the first clutch C1 which, in the engaged state, cooperates with the one-way clutch to establish the first speed serving as the starting shift speed. It is a matter of course that the first clutch C1 is also controlled by the speed change mechanism operation control section 45. Hence, with a special focus on operation control of the first clutch C1, the speed change mechanism operation control section 45 functions as first clutch operation control means (second engagement device operation control means). The speed change mechanism operation control section 45 controls the hydraulic pressure to be supplied to the first clutch C1 via the hydraulic pressure control device 25 to control an operation of the first clutch C1.

For example, the speed change mechanism operation control section 45 adjusts the hydraulic pressure to be supplied to the first clutch C1 to the disengagement pressure less than the disengagement boundary pressure to bring the first clutch C1 into the disengaged state. When the first clutch C1 is in the disengaged state, transfer of a drive force between the rotary electric machine 12 and the intermediate shaft M and the transmission intermediate shaft S is blocked. That is, when the first clutch C1 is in the disengaged state, the first clutch C1 is brought into a state in which the first clutch C1 transfers no drive force. In addition, the speed change mechanism operation control section 45 adjusts the hydraulic pressure to be supplied to the first clutch C1 to a pressure equal to or more than the engagement boundary pressure to bring the first clutch C1 into the directly engaged state, and further adjusts the hydraulic pressure to be supplied to the first clutch C1 to the complete engagement pressure to bring the first clutch C1 into the completely engaged state. When the first clutch C1 is in the directly engaged state (including the completely engaged state), the rotary electric machine 12 and the intermediate shaft M rotate together with the transmission intermediate shaft S to allow transfer of a drive force therebetween. That is, when the first clutch C1 is in the directly engaged state, the first clutch C1 is brought into a state in which the first clutch C1 transfers a drive force while providing no second differential rotational speed ΔN2 to be discussed later. The drive force transferred to the transmission intermediate shaft S is transferred to the wheels 15 via the output shaft O.

Moreover, the speed change mechanism operation control section 45 adjusts the hydraulic pressure to be supplied to the first clutch C1 to the slip engagement pressure equal to or more than the disengagement boundary pressure and less than the engagement boundary pressure to bring the first clutch C1 into the slip engagement state. When the first clutch C1 is in the slip engagement state, the rotary electric machine 12 and the intermediate shaft M rotate relative to the transmission intermediate shaft S to allow transfer of a drive force therebetween. That is, when the first clutch C1 is in the slip engagement state, torque can be transferred while allowing the first clutch C1 to slip. When the first clutch C1 is in the slip engagement state, the first clutch C1 is brought into a state in which the first clutch C1 transfers a drive force while providing the second differential rotational speed ΔN2.

The magnitude of torque that can be transferred by the first clutch C1 in the completely engaged state or the slip engagement state is determined in accordance with the engagement pressure of the first clutch C1 at the time point. The magnitude of torque at the time point is defined as "transfer torque capacity Tc1" of the first clutch C1. That is, torque up to the transfer torque capacity Tc1 of the first clutch C1 at the time point is transferred between the rotary electric machine 12 and the wheels 15 via the first clutch C1. In the present embodiment, as described above, the transfer torque capacity Te1 can be continuously controlled so as to increase and decrease. The direction of torque transferred via the first clutch C1 with the first clutch C1 in the slip engagement state is determined in accordance with the direction of relative rotation between the intermediate shaft M and the transmission intermediate shaft S. The speed change mechanism operation control section 45 further performs a part of the specific starting control in accordance with a command from the specific starting control section 47 to be discussed later.

The differential rotational speed acquisition section 46 is a functional section that acquires the first differential rotational speed ΔN1 and the second differential rotational speed ΔN2, and functions as differential rotational speed acquisition means. Here, the first differential rotational speed ΔN1 is the difference in rotational speed between the input shaft I and the intermediate shaft M, which are engagement members on both sides of the input clutch CT. The differential rotational speed acquisition section 46 acquires the first differential rotational speed ΔN1 as a difference obtained by subtracting the rotational speed of the intermediate shaft M detected by the intermediate shaft rotational speed sensor Se2 from the rotational speed of the input shaft I detected by the input shaft rotational speed sensor Se1. When the input clutch CT is in the completely engaged state, the input shaft I and the intermediate shaft M rotate together with each other, and thus no first differential rotational speed ΔN1 is provided (the first differential rotational speed ΔN1 is zero). When the input clutch CT is in the slip engagement state or the disengaged state, meanwhile, the input shaft I and the intermediate shaft M rotate relative to each other, and thus the first differential rotational speed ΔN1 is provided (the first differential rotational speed ΔN1 is more than zero).

The second differential rotational speed ΔN2 is the difference in rotational speed between the intermediate shaft M and the transmission intermediate shaft S, which are engagement members on both sides of the first clutch C1. The differential rotational speed acquisition section 46 acquires the second differential rotational speed ΔN2 as a difference obtained by subtracting the rotational speed of the transmission intermediate shaft S, which is determined on the basis of the rotational speed of the output shaft O detected by the vehicle speed sensor Se3, from the rotational speed of the intermediate shaft M detected by the intermediate shaft rotational speed sensor Se2. The rotational speed of the transmission intermediate shaft S may be obtained as the product of the rotational speed of the output shaft O and the speed ratio of a shift speed established in the speed change mechanism 13. When the first clutch C1 is in the completely engaged state, the intermediate shaft M and the transmission intermediate shaft S rotate together with each other, and thus no second differential rotational speed ΔN2 is provided (the second differential rotational speed ΔN2 is zero). When the first clutch C1 is in the slip engagement state or the disengaged state, meanwhile, the intermediate shaft M and the transmission intermediate shaft S rotate relative to each other, and thus the second differential rotational speed ΔN2 is provided (the second differential rotational speed ΔN2 is more than zero). Information on the first differential rotational speed ΔN1 and the second differential rotational speed ΔN2 acquired by the differential rotational speed acquisition section 46 is output to the specific starting control section 47.

The specific starting control section 47 is a functional section that executes specific starting control by cooperatively controlling the internal combustion engine control section 31, the rotary electric machine control section 43, the input clutch operation control section 44, the speed change mechanism operation control section 45, and so forth when the vehicle 6 which has been stationary is started, and functions as specific starting control means. Here, the specific starting control is control in which the vehicle 6 is started with the rotary electric machine 12 continuously generating electric power from a state in which the input clutch CT is in the completely engaged state, the first clutch C1 is in the disengaged state, and the rotary electric machine 12 generates electric power. In other words, the specific starting control is control in which the vehicle 6 is started with the rotary electric machine 12 continuously generating electric power from a state in which the input clutch CT provides no first differential rotational speed ΔN1, the rotary electric machine 12 generates electric power, and the first clutch C1 transfers no drive force.

The specific starting control section 47 exhibits its function using as a trigger a fact that the electric power generation mode is selected when the vehicle 6 is stationary as in the present embodiment, for example, and that the rotary electric machine 12 generates electric power with the input clutch CT brought into the completely engaged state to provide no first differential rotational speed ΔN1. It should be understood that the first clutch C1 is in the disengaged state when the vehicle 6 is stationary. That is, the specific starting control section 47 is not functioning when the vehicle 6 is traveling normally, and does not exhibit its function until it is detected that the rotary electric machine 12 generates electric power with no first differential rotational speed ΔN1 provided when the vehicle 6 is stationary.

1-3. Content of Specific Starting Control

Next, the specific starting control executed by the specific starting control section 47 of the drive device control unit 40 serving as a core and through cooperation with the internal combustion engine control section 31, the rotary electric machine control section 43, the input clutch operation control section 44, the speed change mechanism operation control section 45, and so forth will be described in detail with reference to the drawing. In the following description, the functional sections mentioned above including the specific starting control section 47 serving as a core will be occasionally collectively referred to as "specific starting control section 47 etc.". The specific starting control according to the present embodiment is directed to a "specific starting operation" which is an operation to start the vehicle 6 in the specific starting mode described above, and not directed to an operation to start the vehicle 6 with the input clutch CT in the slip engagement state or the disengaged state, which may be referred to as a non-specific starting operation. Likewise, the specific starting control according to the present embodiment is also not directed to an operation to start the vehicle 6 with the rotary electric machine 12 generating no electric power, which is also a type of non-specific starting operation.

Figure 2:
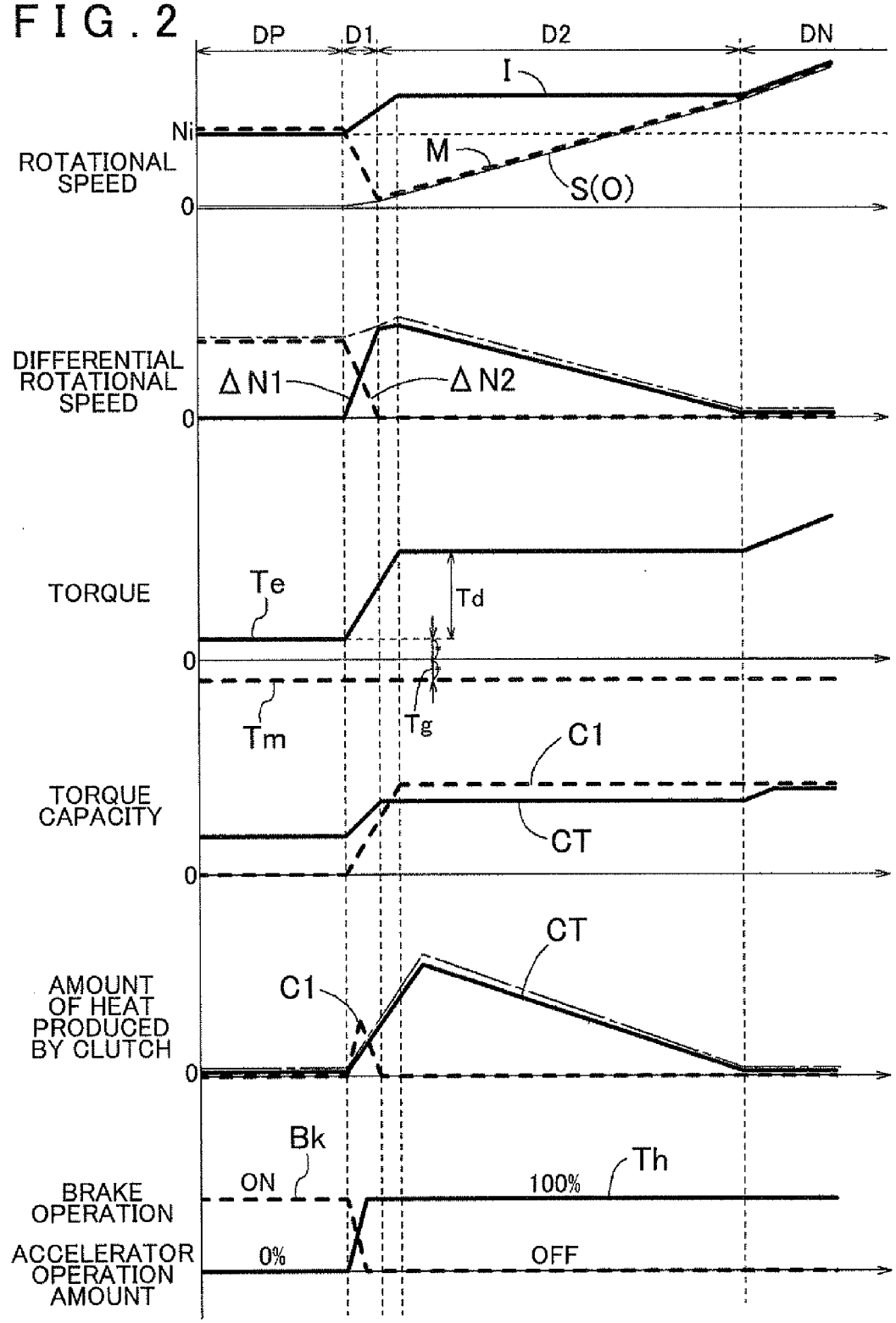
FIG. 2 is a time chart showing the operating states of various components during specific starting control according to the first embodiment.

FIG. 2 is a time chart showing the operating states of various components of the vehicle during the specific starting control according to the present embodiment. In the drawing, the respective rotational speeds of the internal combustion engine 11, the rotary electric machine 12, and the transmission intermediate shaft S, the first differential rotational speed ΔN1 and the second differential rotational speed ΔN2, the respective output torques of the internal combustion engine 11 and the rotary electric machine 12, the respective torque capacities (engagement pressures) of the input clutch CT and the first clutch C1, the respective amounts of heat produced by the input clutch CT and the first clutch C1, and the accelerator operation amount and the brake operation are shown in this order from the top. The rotational speed of the internal combustion engine 11 matches the rotational speed of the input shaft I. The rotational speed of the rotary electric machine 12 matches the rotational speed of the intermediate shaft M. The rotational speed of the transmission intermediate shaft S is proportional to that of the output shaft O. For comparison, the second differential rotational speed ΔN2 and the amount of heat produced by the first clutch C1 for the case where the vehicle 6 is started without performing the specific starting control according to the present embodiment (for example, with the input clutch CT in the completely engaged state and with the first clutch C1 in the slip engagement state) are each indicated by a dash-dotted line.

As shown in FIG. 2, the specific starting control according to the present embodiment includes a first control region D1 serving as a differential rotational speed control region. The specific starting control according to the present embodiment also includes a second control region D2. That is, the specific starting control according to the present embodiment includes two control regions, namely the first control region D1 and the second control region D2. The second control region D2 is executed after the first control region D1. A pre-control region DP is executed before the first control region D1. A normal control region DN is executed after the second control region D2. Hence, in the specific starting control according to the present embodiment, four control regions, namely the pre-control region DP, the first control region D1, the second control region D2, and the normal control region DN, are performed in this order in the event of the specific starting operation. The control regions will be described below in order.

The pre-control region DP is a preliminary control region performed before the substantial specific starting control is performed. In the pre-control region DP, in the present embodiment, the vehicle 6 is stationary, and the electric power generation mode is selected. In the electric power generation mode, the input clutch CT is maintained in the completely engaged state, and the input clutch CT is in a state in which the input clutch CT transfers a drive force while providing no first differential rotational speed ΔN1 (with the first differential rotational speed ΔN1 being zero). In this state, the rotary electric machine 12 generates electric power using torque of the internal combustion engine 11. At this time, the internal combustion engine 11 and the rotary electric machine 12 rotate together with each other, both at an idle rotational speed Ni. At this time, in addition, the internal combustion engine torque Te (=Tg) and the rotary electric machine torque Tm (Tm=−Tg) are equal in magnitude and opposite in direction to each other. In the example, the internal combustion engine torque Te and the rotary electric machine torque Tm are each maintained at a relatively small value. Hence, in the example, the supply hydraulic pressure for the input clutch CT is also maintained at a relatively low pressure, but at least the transfer torque capacity Tct of the input clutch CT is maintained at a value equal to or more than the internal combustion engine torque Te. Consequently, the input clutch CT is maintained in the completely engaged state, and the input clutch CT is maintained in a state in which the input clutch CT provides no first differential rotational speed ΔN1. Meanwhile, the first clutch C1 is maintained in the disengaged state, and the first clutch C1 provides a significant second differential rotational speed ΔN2 while transferring no drive force. At this time, the second differential rotational speed ΔN2 is equal to the idle rotational speed Ni, which is the rotational speed of the internal combustion engine 11 and the rotary electric machine 12 rotating together with each other. In addition, the accelerator operation amount is zero, and a brake operation is performed.

In the pre-control region DP, the specific starting control section 47 monitors a driver's starting operation. Here, the term "starting operation" refers to an operation performed by the driver to start the vehicle 6 which has been stationary. In the present embodiment, an operation to depress the accelerator pedal 17 and an operation to release the brake pedal 18 are referred to as a "starting operation". For example, a starting operation may be sensed when the accelerator operation amount detected by the accelerator operation amount detection sensor Se4 has become equal to or more than a predetermined amount (for example, 1 to 10%) and the brake pedal operation detection sensor Se5 has detected that a brake operation is canceled. When a starting operation performed by the driver is sensed by the specific starting control section 47, substantial control (in the present embodiment, the first control region D1 and the second control region D2) of the specific starting control is started.

The first control region D1 is a control region performed in the initial stage of the specific starting control. In the first control region D1, the first differential rotational speed ΔN1 is increased gradually (in the example, at a constant time variation rate) with the input clutch CT in the slip engagement state, and the second differential rotational speed ΔN2 is decreased gradually (in the example, at a constant time variation rate). That is, in the first control region D1, the input clutch CT is transitioned from a state in which the input clutch CT transfers a drive force while providing no first differential rotational speed ΔN1 to a state in which the input clutch CT transfers a drive force while providing the first differential rotational speed ΔN1, and the first clutch C1 is transitioned from a state in which the first clutch C1 transfers no drive force to a state in which the first clutch C1 transfers a drive force while providing the second differential rotational speed ΔN2.

In the first control region D1, the vehicle required torque Td and the internal combustion engine required torque are increased in accordance with an operation to depress the accelerator pedal 17 performed by the driver of the vehicle 6. The specific starting control section 47 outputs the internal combustion engine required torque provided as an internal combustion engine control command to the internal combustion engine control section 31 via the required torque decision section 42. The internal combustion engine torque Te is increased in accordance with the internal combustion engine required torque. The rotational speed of the internal combustion engine 11 and the input shaft I is also raised. In the example, the rotary electric machine torque Tm (=−Tg) is maintained at the same constant value also in the first control region D1 (and in the subsequent control regions as well). This causes the rotary electric machine 12 to generate at least an amount of electric power corresponding to the electric power generation torque Tg and the rotational speed of the rotary electric machine 12. In this state, the input clutch operation control section 44 gradually increases the supply hydraulic pressure for the input clutch CT to a predetermined pressure less than the engagement boundary pressure via the hydraulic pressure control device 25 to bring the input clutch CT into the slip engagement state. In addition, the speed change mechanism operation control section 45 gradually increases the supply hydraulic pressure for the first clutch C1 to the complete engagement pressure via the hydraulic pressure control device 25 to bring the first clutch C1 into the completely engaged state.

In the first control region D1, the hydraulic pressure to be supplied to the first clutch C1 is increased to the complete engagement pressure, which causes the rotational speed of the intermediate shaft M to be significantly reduced relatively quickly by a travel resistance transferred via the wheels 15, the output shaft O, the transmission intermediate shaft S, and the first clutch C1. Meanwhile, the rotational speed of the input shaft I is raised as described above, and the rotational speed of the transmission intermediate shaft S is raised gently in proportion to the vehicle speed. Accordingly, in the first control region D1 of the specific starting control according to the present embodiment, the specific starting control section 47 etc. decreases the second differential rotational speed $\Delta N2$ relatively rapidly, and increases the first differential rotational speed $\Delta N1$ relatively rapidly. In the example, the second differential rotational speed $\Delta N2$ is decreased until the second differential rotational speed $\Delta N2$ is eliminated. That is, in the first control region D1 according to the present embodiment, the first clutch C1 is transitioned from a state in which the first clutch C1 transfers no drive force to a state in which the first clutch C1 transfers a drive force while providing the second differential rotational speed $\Delta N2$, and further to a state in which the first clutch C1 transfers a drive force while providing no second differential rotational speed $\Delta N2$.

In the first control region D1, the internal combustion engine control section 31 executes control in which the internal combustion engine torque Te follows the internal combustion engine required torque in accordance with the internal combustion engine required torque provided as an internal combustion engine control command. Here, in the present embodiment, target torque for the internal combustion engine 11 (internal combustion engine required torque) is set to the sum of the vehicle required torque Td and the electric power generation torque Tg. The specific starting control section 47 provides a command for the internal combustion engine required torque which is equal to the sum of the vehicle required torque Td and the electric power generation torque Tg to the internal combustion engine control section 31 via the required torque decision section 42. The internal combustion engine control section 31 causes the internal combustion engine 11 to output the internal combustion engine torque Te (=Tg+Td) which is equal to the sum of the vehicle required torque Td and the electric power generation torque Tg in accordance with the internal combustion engine required torque.

In the first control region D1, the input clutch operation control section 44 executes control in which the first differential rotational speed $\Delta N1$ of the input clutch CT reaches a predetermined target differential rotational speed more than zero. In the present embodiment, the target value for the first differential rotational speed $\Delta N1$ is set so as to rise gradually (in the example, at a constant time variation rate). That is, in the first control region D1, the input clutch operation control section 44 controls the supply hydraulic pressure for the input clutch CT (the engagement pressure of the input clutch CT) such that the first differential rotational speed $\Delta N1$ of the input clutch CT is gradually increased. By controlling the input clutch CT in this way, it is possible to appropriately transfer torque transferred to the input shaft I from the internal combustion engine 11 side to the rotary electric machine 12 side via the input clutch CT while gradually increasing the first differential rotational speed $\Delta N1$.

In the first control region D1, the speed change mechanism operation control section 45 executes control in which the second differential rotational speed $\Delta N2$ of the first clutch C1 reaches a predetermined target differential rotational speed more than zero. In the present embodiment, the target value for the second differential rotational speed $\Delta N2$ is set so as to reduce gradually (in the example, at a constant time variation rate). That is, in the first control region D1, the speed change mechanism operation control section 45 controls the supply hydraulic pressure for the first clutch C1 (the engagement pressure of the first clutch C1) such that the second differential rotational speed $\Delta N2$ of the first clutch C1 is gradually decreased. In this event, the speed change mechanism operation control section 45 controls the supply hydraulic pressure for the first clutch C1 such that the transfer torque capacity Tc1 of the first clutch C1 becomes at least equal to or more than the vehicle required torque Td decided by the required torque decision section 42. By controlling the first clutch C1 in this way, it is possible to transfer a portion of the internal combustion engine torque Te transferred to the intermediate shaft M with a magnitude equivalent to the vehicle required torque Td to the output shaft C1 on the wheels 15 side via the first clutch C1, while gradually decreasing the second differential rotational speed $\Delta N2$.

In the first control region D1, in addition, the specific starting control section 47 monitors whether or not the second differential rotational speed $\Delta N2$ of the first clutch C1 has been eliminated (the second differential rotational speed $\Delta N2$ has become zero). The first control region D1 is executed until the second differential rotational speed $\Delta N2$ is eliminated. When the second differential rotational speed $\Delta N2$ is eliminated, the second control region D2 is started next.

The second control region D2 is a control region performed in the intermediate stage to the final state of the specific starting control according to the present embodiment. In the second control region D2, the first differential rotational speed $\Delta N1$ of the input clutch CT is gradually decreased along with a rise in rotational speed of the output shaft O with the first clutch C1 providing no second differential rotational speed $\Delta N2$. That is, in the second control region D2, the input clutch CT is transitioned from a state in which the input clutch CT transfers a drive force while providing the first differential rotational speed $\Delta N1$ to a state in which the input clutch CT transfers a drive force while providing no first differential rotational speed $\Delta N1$ along with a rise in rotational speed of the output shaft O and rotational speed of the transmission intermediate shaft S which is proportional to the rotational speed of the output shaft O with the first clutch C1 providing no second differential rotational speed ΔN2.

In the second control region D2, except in the initial stage of the second control region D2, the internal combustion engine torque Te is maintained at a constant value that is not varied over time, and the rotational speed of the internal combustion engine 11 and the input shaft I is also maintained at a constant value that is not varied over time. The term "constant value that is not varied over time" is intended to refer to a value that is generally not varied over time but that is kept substantially constant. It is not required that the value should not be varied over time at all, and it is a matter of course that the value is allowed to be momentarily varied more or less (the same applies hereinafter).

The input clutch operation control section 44 maintains the supply hydraulic pressure for the input clutch CT, which has been increased to a predetermined pressure via the hydraulic pressure control device 25 in the first control region D1, basically at the same constant value to maintain the input clutch CT in the slip engagement state. As discussed later, the input clutch operation control section 44 performs feedback control on the supply hydraulic pressure for the input clutch CT to maintain the supply hydraulic pressure for the input clutch CT at a generally constant value with some repeated fluctuations. In the second control region D2, in addition, the first clutch C1 has already been brought into the completely engaged state, and thus the rotational speed of the intermediate shaft M which rotates together with the transmission intermediate shaft S is raised gently along with a rise in vehicle speed. Accordingly, in the second control region D2 of the specific starting control according to the present embodiment, the specific starting control section 47 etc. maintains a state in which there is no second differential rotational speed ΔN2, and decreases the first differential rotational speed ΔN1 gradually (in the example, gently at a constant time variation rate) except in the initial stage of the second control region D2.

In this event, in the present embodiment, the internal combustion engine control section 31 performs operation control of the internal combustion engine 11 so as to output the internal combustion engine torque Te with a magnitude equivalent to a portion of the drive torque corresponding to the vehicle required torque Td to be carried by the internal combustion engine 11 on the basis of the internal combustion engine required torque decided by the required torque decision section 42. In the present embodiment, the rotary electric machine 12 is supplied with the electric power generation torque Tg to generate electric power during the specific starting control. Thus, the "internal combustion engine torque Te with a magnitude equivalent to a portion of the drive torque corresponding to the vehicle required torque Td to be carried by the internal combustion engine 11" matches the sum of the vehicle required torque Td and the electric power generation torque Tg (Te=Td+Tg) as described above. In this state, the input clutch operation control section 44 controls the supply hydraulic pressure for the input clutch CT via the hydraulic pressure control device 25 such that the rotational speed of the input shaft I, that is, the rotational speed of the internal combustion engine output shaft of the internal combustion engine 11, is maintained at a predetermined rotational speed. The "predetermined rotational speed" in this case corresponds, in the example, to the rotational speed of the internal combustion engine 11 required for the internal combustion engine 11 to output the internal combustion engine torque Te corresponding to the internal combustion engine required torque. Such a relationship between the internal combustion engine torque Te and the rotational speed is defined in the form of a map, a formula, or the like, and stored in a storage medium such as a memory (not shown). By performing such feedback control on the supply hydraulic pressure for the input clutch CT, it is possible to transfer the internal combustion engine torque Te with an appropriate magnitude to the wheels 15 side via the input clutch CT.

In the second control region D2, in addition, the specific starting control section 47 monitors whether or not the first differential rotational speed ΔN1 of the input clutch CT has been eliminated (whether or not the first differential rotational speed ΔN1 has become zero). The second control region D2 is executed until the first differential rotational speed ΔN1 is eliminated. When the first differential rotational speed ΔN1 is eliminated, the input clutch operation control section 44 raises the supply hydraulic pressure for the input clutch CT to the complete engagement pressure via the hydraulic pressure control device 25 to bring the input clutch CT into the completely engaged state. The specific starting control is thus terminated. After the specific starting control is terminated, normal travel control is started. In the time chart of FIG. 2, a region for the normal travel control is indicated as the normal control region DN. In the normal control region DN, the parallel mode is selected, for example, and the internal combustion engine control section 31 and the rotary electric machine control section 43 appropriately perform operation control of the internal combustion engine 11 and the rotary electric machine 12, respectively, in accordance with the travel states of the vehicle 6 with the input clutch CT in the completely engaged state to drive the vehicle 6.

In this way, in the specific starting control according to the present embodiment, the first control region D1 serving as the differential rotational speed control region and the second control region D2 executed after the first control region D1 are performed in the event of the specific starting operation in which the vehicle 6 is started with the rotary electric machine 12 continuously generating electric power from a state in which the rotary electric machine 12 generates electric power with the input clutch CT in the completely engaged state CT and in which the first clutch C1 is in the disengaged state. This allows the vehicle 6 to be started with the rotary electric machine 12 continuously maintained in the electric power generating state while bringing the input clutch CT into the slip engagement state to gradually decrease the second differential rotational speed ΔN2 and to gradually increase the first differential rotational speed ΔN1 in the first control region D1. Further, after the second differential rotational speed ΔN2 is eliminated to completely engage the first clutch C1, the first differential rotational speed ΔN1 is gradually decreased until the first differential rotational speed ΔN1 is eliminated with the rotary electric machine 12 continuously maintained in the electric power generating state to completely engage the input clutch CT in the second control region D2. In such specific starting control, the second differential rotational speed ΔN2 is gradually decreased in the first control region D1. Thus, it is possible to reduce the amount of slip of the first clutch C1 to reduce the amount of heat produced by the first clutch C1 as shown in FIG. 2. Hence, it is possible to suppress overheating of the first clutch C1 to suppress a reduction in durability of the first clutch C1. The temperature of the first clutch C1 is raised with a slight delay after the first clutch C1 is brought into the slip engagement state. Therefore, it is possible to effectively suppress overheating of the first clutch C1 to its allowable temperature or higher by gradually reducing the second differential rotational speed ΔN2 to gradually reduce the amount of slip of the first clutch C1 as described above.

In the present embodiment, in addition, in the first control region D1, the hydraulic pressure to be supplied to the first clutch C1 is increased to the complete engagement pressure, the second differential rotational speed $\Delta N2$ is decreased relatively rapidly to zero, and the first differential rotational speed $\Delta N1$ is increased relatively rapidly. Consequently, it is possible to effectively reduce the amount of heat produced by the first clutch C1 to effectively suppress a reduction in durability of the first clutch C1.

In particular, for the starting engagement device provided in the speed change mechanism 13 and brought into the engaged state to establish a shift speed for starting (the first speed in the example), such as the first clutch C1 according to the present embodiment, the rotational speed of an engagement member (the transmission intermediate shaft S in the example) on the downstream side of the starting engagement device in the power transfer path tends to be raised at a gentle speed in proportion to the vehicle speed at the time when the vehicle is started. Therefore, in the case where the vehicle is started in the WSC mode described in the "Description of the Related Art" section, the amount of slip (second differential rotational speed $\Delta N2$) of the first clutch C1 becomes relatively large to also make the amount of heat produced by the first clutch C1 relatively large (see the dash-dotted lines in FIG. 2). Meanwhile, the input clutch CT provided outside the speed change mechanism 13 between the internal combustion engine 11 and the rotary electric machine 12 is often excellent in durability against slipping and heat-resistant performance compared to the first clutch C1. Thus, by executing the specific starting control according to the present embodiment, it is possible to comprehensively optimize the respective amounts of heat produced by the first clutch C1 and the input clutch CT by decreasing the second differential rotational speed $\Delta N2$ corresponding to the amount of slip of the first clutch C1 and increasing the first differential rotational speed $\Delta N1$ corresponding to the amount of slip of the input clutch CT in the event of the specific starting operation. That is, it is possible to optimize the respective amounts of heat produced by the clutches CT and C1 in consideration of the durability of the clutches CT and C1 against slipping by appropriately adjusting the first differential rotational speed $\Delta N1$ and the second differential rotational speed $\Delta N2$ so as to suppress an increase only in amount of heat produced by the first clutch C1 with only the second differential rotational speed $\Delta N2$ maintained at a large value. Hence, the configuration of the drive device 1 in which the "starting engagement device" is provided as the "second engagement device" as in the present embodiment is particularly suitable for application of the present invention.

In the first control region D1, in addition, the first differential rotational speed $\Delta N1$ is gradually increased, and the input clutch CT is still maintained in the slip engagement state. Therefore, by causing the internal combustion engine 11 to output large internal combustion engine torque Te, it is possible to transfer at least torque corresponding to the transfer torque capacity Tct of the input clutch CT to the wheels 15 side via the input clutch CT. In the present embodiment, in particular, with the internal combustion engine 11 outputting the internal combustion engine torque Te (=Td+Tg) with a magnitude equivalent to a portion of the drive torque corresponding to the vehicle required torque Td to be carried by the internal combustion engine 11, the input clutch operation control section 44 performs feedback control on the supply hydraulic pressure for the input clutch CT so as to achieve a rotational speed of the internal combustion engine 11 required to output such internal combustion engine torque Te. Hence, it is possible to transfer the internal combustion engine torque Te with an appropriate magnitude to the wheels 15 side via the input clutch CT, and to secure a sufficient drive force for driving the vehicle 6 during the specific starting operation utilizing the internal combustion engine torque Te. Thus, the drive device 1 according to the present embodiment makes it possible to secure a sufficient drive force for starting the vehicle while suppressing a reduction in durability of the first clutch C1 in the event of the specific starting operation.

In the present embodiment, further, in the specific starting control, the electric power generation torque Tg, which is the difference between the internal combustion engine torque Te (=Td+Tg) and the vehicle required torque Td is provided to the rotary electric machine 12, and the rotary electric machine 12 is maintained in the electric power generating state. Therefore, even in the case where the vehicle 6 is started from a situation in which the rotary electric machine 12 generates electric power with the electric power generation mode established while the vehicle 6 is stationary, the electric power generation performed by the rotary electric machine 12 is not interrupted by the start of the vehicle 6. Hence, a sufficient amount of electric power can be accumulated in the electricity accumulation device 28 even in the case where the vehicle 6 travels at a low vehicle speed for a long time compared to the time for which the vehicle 6 is stationary (such as a case where the vehicle 6 must travel at an extremely low vehicle speed for a long time, for example a case where the vehicle 6 travels on a crowded road). During travel at an extremely low vehicle speed, in particular, it is necessary that at least one of the input clutch CT and the first clutch C1 should be brought into the slip engagement state to continue self-sustained operation of the internal combustion engine 11. Even in such a case, a sufficient amount of electric power can advantageously be accumulated in the electricity accumulation device 28 while suppressing a reduction in durability of the clutches CT and C1.

1-4. Process Procedures of Specific Starting Control

Figure 3:
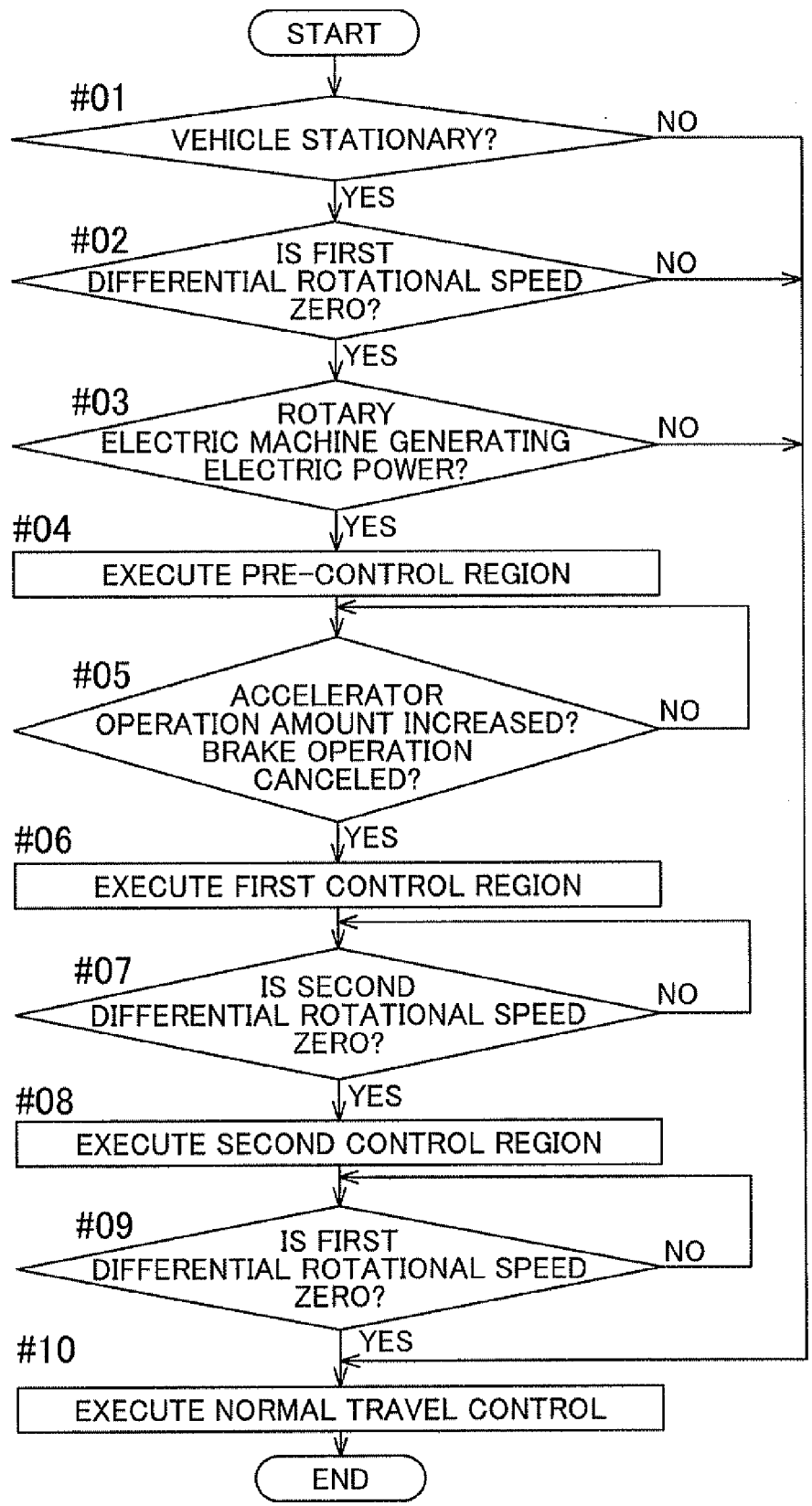
FIG. 3 is a flowchart showing the process procedures of specific starting control according to the first embodiment.

Next, the process procedures of the specific starting control performed by the control device 3 according to the present embodiment will be described. In the example, a case where the vehicle 6 is started in the specific starting mode (a case where a specific starting operation is performed) from a state in which the electric power generation mode is established while the vehicle 6 is stationary will be described. FIG. 3 is a flowchart showing the process procedures of the specific starting control according to the present embodiment. The procedures of the specific starting control described below are executed by the respective functional sections of the internal combustion engine control unit 30 and the drive device control unit 40. In the case where the functional sections are implemented by a program, the arithmetic processing unit provided in the internal combustion engine control unit 30 and the drive device control unit 40 operates as a computer that executes the program implementing the functional sections.

As shown in FIG. 3, it is first determined whether or not the vehicle is stationary (step #01). The determination may be made on the basis of information on the vehicle speed detected by the vehicle speed sensor Se3, for example. In the case where it is determined that the vehicle is stationary (step #01: Yes), it is next determined whether or not the first differential rotational speed $\Delta N1$ of the input clutch CT has been eliminated (whether or not the first differential rotational speed $\Delta N1$ has become zero) (step #02). In the case where it is determined that the first differential rotational speed $\Delta N1$ of the input clutch CT has been eliminated (step #02: Yes), it is next determined whether or not the rotary electric machine 12 is generating electric power (step #03). In the case where it is determined that the vehicle is not stationary (step #01: No), it is determined that the first differential rotational speed ΔN1 of the input clutch CT has not been eliminated (step #02: No), or it is determined that the rotary electric machine 12 is not generating electric power (step #03: No), the normal travel control is executed (step #10) to terminate the specific starting control without performing substantial control of the specific starting control to which the present invention is directed. In the event that a non-specific starting operation is performed in the case where it is determined that the first differential rotational speed ΔN1 has not been eliminated or it is determined that the rotary electric machine 12 is not generating electric power, the vehicle may be started in the electric power travel mode, for example.

Meanwhile, in the case where it is determined that the vehicle is stationary (step #01: Yes), it is determined that the first differential rotational speed ΔN1 has been eliminated (step #02: Yes), and it is determined that the rotary electric machine 12 is generating electric power (step #03: Yes), the pre-control region DP is executed (step #04). The content of control performed by the specific starting control section 47 etc. in the pre-control region DP is as described above. Next, the specific starting control section 47 determines whether or not the driver has made a starting operation, that is, whether or not the accelerator operation amount has been raised to a predetermined amount or more and the brake operation has been canceled in the example (step #05). If it is determined that a starting operation has been made (step #05: Yes), substantial control of the specific starting control to which the present invention is directed is started.

That is, the first control region D1 is first executed (step #06). The content of control performed by the specific starting control section 47 etc. in the first control region D1 is as described above. In the first control region D1, the specific starting control section 47 monitors whether or not the second differential rotational speed ΔN2 of the first clutch C1 has been eliminated (whether or not the second differential rotational speed ΔN2 has become zero) (step #07). Then, if it is determined that the second differential rotational speed ΔN2 has been eliminated (step #07: Yes), the second control region D2 is executed next (step #08). The content of control performed by the specific starting control section 47 etc. in the second control region D2 is as described above. In the second control region D2, the specific starting control section 47 monitors whether or not the first differential rotational speed ΔN1 of the input clutch CT has been eliminated (whether or not the first differential rotational speed ΔN1 has become zero) (step #09). Then, if it is determined that the first differential rotational speed ΔN1 has been eliminated (step #09: Yes), substantial control of the specific starting control is terminated. During the control, the rotary electric machine 12 is maintained in the electric power generating state. After that, the normal control region DN is executed as the normal travel control (step #10) to terminate the specific starting control.

With the drive device 1 according to the present embodiment, as has been described above, by executing the specific starting control, it is possible to start the vehicle 6 with the rotary electric machine 12, which has been generating electric power since the vehicle is stationary, continuously maintained in the electric power generating state while suppressing a reduction in durability of the first clutch C1.

2. Second Embodiment

A control device according to a second embodiment of the present invention will be described with reference to the drawings. The configuration of the drive train of the drive device 1 and the configuration of the control device 3 according to the present embodiment are basically the same as those according to the first embodiment described above. The specific content of the specific starting control executed by the specific starting control section 47 etc. is partially different from that according to the first embodiment described above. The differences between the control device 3 according to the present embodiment and that according to the first embodiment described above will be mainly described below. The same elements as those according to the first embodiment described above will not be specifically described.

2-1. Content of Specific Starting Control

Figure 4:
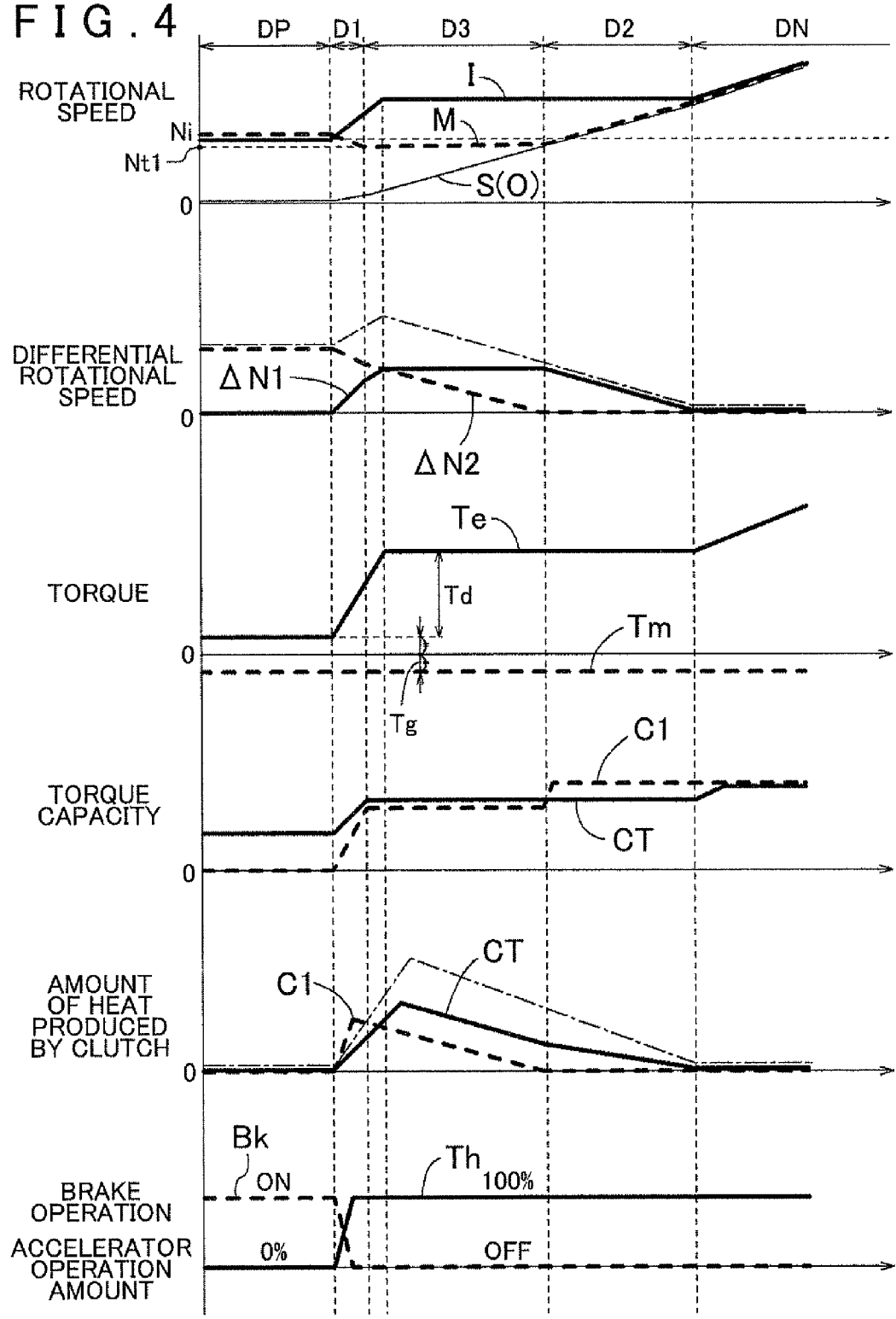
FIG. 4 is a time chart showing the operating states of various components during specific starting control according to a second embodiment.

The specific starting control according to the present embodiment will be described in detail below. FIG. 4 is a time chart showing the operating states of various components of the vehicle during the specific starting control according to the present embodiment. Also in the drawing, as in the first embodiment described above, the respective rotational speeds of the internal combustion engine 11, the rotary electric machine 12, and the transmission intermediate shaft S (output shaft O), the first differential rotational speed ΔN1 and the second differential rotational speed ΔN2, the respective output torques of the internal combustion engine 11 and the rotary electric machine 12, the respective torque capacities (engagement pressures) of the input clutch CT and the first clutch C1, the respective amounts of heat produced by the input clutch CT and the first clutch C1, and the accelerator operation amount and the brake operation are shown in this order from the top.

As shown in FIG. 4, the specific starting control according to the present embodiment is provided with three control regions, namely a first control region D1, a second control region D2, and a third control region D3 performed in the event of the specific starting operation. The second control region D2 is executed after the first control region D1. The third control region D3 is executed between the first control region D1 and the second control region D2. A pre-control region DP is executed before the first control region D1. A normal control region DN is executed after the second control region D2. Hence, in the specific starting control according to the present embodiment, five control regions, namely the pre-control region DP, the first control region D1, the third control region D3, the second control region D2, and the normal control region DN, are performed in this order in the event of the specific starting operation. The control regions will be described below in order.

The pre-control region DP is a preliminary control region performed before the substantial specific starting control is performed. In the electric power generation mode selected in the pre-control region DP, the input clutch CT is maintained in the completely engaged state, and the input clutch CT is in a state in which the input clutch CT transfers a drive force while providing no first differential rotational speed ΔN1 (with the first differential rotational speed ΔN1 being zero). In this state, the rotary electric machine 12 generates electric power using torque of the internal combustion engine 11. At this time, the input clutch CT is maintained in the completely engaged state, and maintained in a state in which the input clutch CT provides no first differential rotational speed ΔN1. Meanwhile, the first clutch C1 is maintained in the disengaged state, and the first clutch C1 provides a significant second differential rotational speed ΔN2 while transferring no drive force. In the pre-control region DP, the specific starting control section 47 monitors a driver's starting operation. When a starting operation performed by the driver is sensed by the specific starting control section 47, substantial control (in the present embodiment, the first control region D1, the third control region D3, and the second control region D2) of the specific starting control is started.

The first control region D1 is a control region performed in the initial stage of the specific starting control. In the first control region D1, the first differential rotational speed $\Delta N1$ is increased gradually (in the example, at a constant time variation rate) with the input clutch CT in the slip engagement state, and the second differential rotational speed $\Delta N2$ is decreased gradually (in the example, at a constant time variation rate). In the first control region D1, the vehicle required torque Td and the internal combustion engine required torque are increased in accordance with an operation to depress the accelerator pedal 17 performed by the driver of the vehicle 6, and the internal combustion engine torque Te is increased accordingly. The rotational speed of the internal combustion engine 11 and the input shaft I is also raised. In the example, the rotary electric machine torque Tm (=−Tg) is maintained at the same constant value. In this state, the input clutch operation control section 44 gradually increases the supply hydraulic pressure for the input clutch CT to a predetermined pressure less than the engagement boundary pressure via the hydraulic pressure control device 25 to bring the input clutch CT into the slip engagement state. In addition, the speed change mechanism operation control section 45 gradually increases the supply hydraulic pressure for the first clutch C1 to a predetermined pressure less than the engagement boundary pressure via the hydraulic pressure control device 25 to bring the input clutch CT into the slip engagement state.

In the first control region D1, the hydraulic pressure to be supplied to the first clutch C1 is increased to a predetermined pressure less than the engagement boundary pressure, which causes the rotational speed of the intermediate shaft M to be reduced by a travel resistance transferred via the wheels 15, the output shaft O, the transmission intermediate shaft S, and the first clutch C1. At this time, in the present embodiment, the input clutch operation control section 44 controls the supply hydraulic pressure for the first clutch C1 so as to reduce the rotational speed of the intermediate shaft M to a predetermined target rotational speed Nt. In the present embodiment, the target rotational speed Nt is set to a rotational speed (which is referred to as "first target rotational speed Nt1") at which the oil pump 24 can secure a supply hydraulic pressure required for both the input clutch CT and the first clutch C1. In the present embodiment, further, the first target rotational speed Nt1 is set to a rotational speed at which the oil pump 24 can secure a supply hydraulic pressure required for all the hydraulically-driven engagement devices provided in the drive device 1 including the input clutch CT and the first clutch C1. In the illustrated example, the first target rotational speed Nt1 is set to an intermediate rotational speed between the rotational speed of the input shaft I and the rotational speed of the transmission intermediate shaft S in the final stage of the first control region D1, more specifically a rotational speed slightly lower than the idle rotational speed Ni.

Meanwhile, the rotational speed of the input shaft I is raised as described above, and the rotational speed of the transmission intermediate shaft S is raised gently in proportion to the vehicle speed. Accordingly, in the first control region D1 of the specific starting control according to the present embodiment, the specific starting control section 47 etc. decreases the second differential rotational speed $\Delta N2$, and increases the first differential rotational speed $\Delta N1$. At this time, the period (time) of the first control region D1 in the present embodiment is substantially the same as the period (time) of the first control region D1 in the first embodiment described above. Therefore, in the present embodiment, the second differential rotational speed $\Delta N2$ is decreased relatively gently, and the first differential rotational speed $\Delta N1$ is increased relatively gently, compared to the first embodiment described above. In the first control region D1, in addition, the specific starting control section 47 monitors whether or not the rotational speed of the intermediate shaft M has reached the first target rotational speed Nt1 described above. The first control region D1 is executed until the rotational speed of the intermediate shaft M reaches the first target rotational speed Nt1. When the rotational speed of the intermediate shaft M becomes equal to the first target rotational speed Nt1, the third control region D3 is started next.

In the present embodiment, the third control region D3 is a control region performed in the intermediate stage of the specific starting control. In the third control region D3, the rotational speed of the intermediate shaft M is maintained at the target rotational speed Nt (in the example, the first target rotational speed Nt1) that is set to a constant value, with the rotational speed of the output shaft O and the rotational speed of the transmission intermediate shaft S, which is proportional to the rotational speed of the output shaft O, rising, so as to gradually decrease the second differential rotational speed $\Delta N2$. In the third control region D3, except in the initial stage of the third control region D3, the internal combustion engine torque Te is maintained at a constant value that is not varied over time, and the rotational speed of the internal combustion engine 11 and the input shaft I is also maintained at a constant value that is not varied over time. The input clutch operation control section 44 maintains the supply hydraulic pressure for the input clutch CT, which has been increased to a predetermined pressure via the hydraulic pressure control device 25 in the first control region D1, basically at the same constant value to maintain the input clutch CT in the slip engagement state. Also in the present embodiment, the input clutch operation control section 44 performs feedback control on the supply hydraulic pressure for the input clutch CT to maintain the supply hydraulic pressure for the input clutch CT at a generally constant value with some repeated fluctuations. In the third control region D3, in addition, the rotational speed of the intermediate shaft M is maintained at the first target rotational speed Nt1, and maintained at a constant value that is not varied over time. Accordingly, in the third control region D3 of the specific starting control according to the present embodiment, the specific starting control section 47 etc. maintains the first differential rotational speed $\Delta N1$ at a constant value that is not varied over time except in the initial stage of the third control region D3, and decreases the second differential rotational speed $\Delta N2$ gently at a constant time variation rate.

In this event, also in the present embodiment, as in the first embodiment described above, the internal combustion engine control section 31 performs operation control of the internal combustion engine 11 so as to output the internal combustion engine torque Te (=Td+Tg) with a magnitude equivalent to a portion of the drive torque corresponding to the vehicle required torque Td to be carried by the internal combustion engine 11 on the basis of the internal combustion engine required torque decided by the required torque decision section 42. In this state, the input clutch operation control section 44 controls the supply hydraulic pressure for the input clutch CT via the hydraulic pressure control device 25 such that the rotational speed of the input shaft I, that is, the rotational speed of the internal combustion engine output shaft of the internal combustion engine 11, is maintained at a predetermined rotational speed required for the internal combustion engine 11 to output the internal combustion engine torque Te corresponding to the internal combustion engine required torque. By performing such feedback control on the supply hydraulic pressure for the input clutch CT, it is possible to transfer the internal combustion engine torque Te with an appropriate magnitude to the wheels 15 side via the input clutch CT. Such operation control of the internal combustion engine 11 and the input clutch CT is performed continuously also in the second control region D2 executed after the third control region D3.

In the third control region D3, in addition, the specific starting control section 47 monitors whether or not the second differential rotational speed ΔN2 of the first clutch C1 has been eliminated (whether or not the second differential rotational speed ΔN2 has become zero). The third control region D3 is executed until the second differential rotational speed ΔN2 is eliminated. When the second differential rotational speed ΔN2 is eliminated, the speed change mechanism operation control section 45 raises the supply hydraulic pressure for the first clutch C1 to the complete engagement pressure via the hydraulic pressure control device 25 to bring the first clutch C1 into the completely engaged state. Next, the second control region D2 is started. The content of control performed in the second control region D2 and the subsequent normal control region DN is the same as that according to the first embodiment described above, and thus is not described in detail here.

In this way, in the specific starting control according to the present embodiment, the first control region D1 and the third control region D3 and the second control region D2 executed after the first control region D1 are performed in the event of the specific starting operation in which the vehicle 6 is started with the rotary electric machine 12 continuously generating electric power from a state in which the rotary electric machine 12 generates electric power with the input clutch CT in the completely engaged state CT and in which the first clutch C1 is in the disengaged state. This allows the vehicle 6 to be started with the rotary electric machine 12 continuously maintained in the electric power generating state while bringing the input clutch CT into the slip engagement state to gradually decrease the second differential rotational speed ΔN2 and to gradually increase the first differential rotational speed ΔN1 in the first control region D1. Further, after the second differential rotational speed ΔN2 is eliminated to completely engage the first clutch C1 in the third control region D3, the first differential rotational speed ΔN1 is gradually decreased until the first differential rotational speed ΔN1 is eliminated to completely engage the input clutch CT in the second control region D2. In such specific starting control, the second differential rotational speed ΔN2 is gradually decreased in the first control region D1 and the third control region D3. Thus, it is possible to reduce the amount of slip of the first clutch C1 to reduce the amount of heat produced by the first clutch C1. Hence, it is possible to suppress overheating of the first clutch C1 to suppress a reduction in durability of the first clutch C1. In addition, it is possible to transfer the internal combustion engine torque Te with an appropriate magnitude to the wheels 15 side via the input clutch CT in the event of the specific starting operation, and thus to secure a sufficient drive force for driving the vehicle 6.

In the present embodiment, in addition, the rotational speed of the intermediate shaft M is maintained at the predetermined first target rotational speed Nt1 in the third control region D3. Consequently, the supply hydraulic pressure required for all the hydraulically-driven engagement devices provided in the drive device 1 (including the input clutch CT and the first clutch C1) can be secured by the oil pump 24 driven to rotate at the first target rotational speed Nt1. Thus, the drive device 1 according to the present embodiment is not provided with the electric oil pump provided along with the oil pump 24 in the first embodiment described above. In this way, in the present embodiment, the electric oil pump serving as an additional hydraulic pressure source that can be actuated independently of the internal combustion engine 11 and the rotary electric machine 12 serving as drive force sources for the vehicle 6 may be omitted to reduce the manufacturing cost of the drive device 1.

Further, in the third control region D3, the rotational speed of the intermediate shaft M is maintained at the predetermined target rotational speed Nt (in the example, the first target rotational speed Nt1). This allows the second differential rotational speed ΔN2 to smoothly converge to zero in the final stage of the third control region D3, which suppresses abrupt fluctuations in rotational speed of the intermediate shaft M around the time point when the second differential rotational speed ΔN2 is eliminated. Hence, it is possible to suppress transfer of such abrupt fluctuations in rotational speed of the intermediate shaft M to the transmission intermediate shaft S, the output shaft O, and the wheels 15 via the first clutch C1, and to suppress generation of a shock at the time point when the second differential rotational speed ΔN2 is eliminated. In addition, it is possible to maintain the rotary electric machine 12 in the electric power generating state to accumulate a sufficient amount of electric power accumulated in the electricity accumulation device 28.

2-2. Process Procedures of Specific Starting Control

Figure 5:
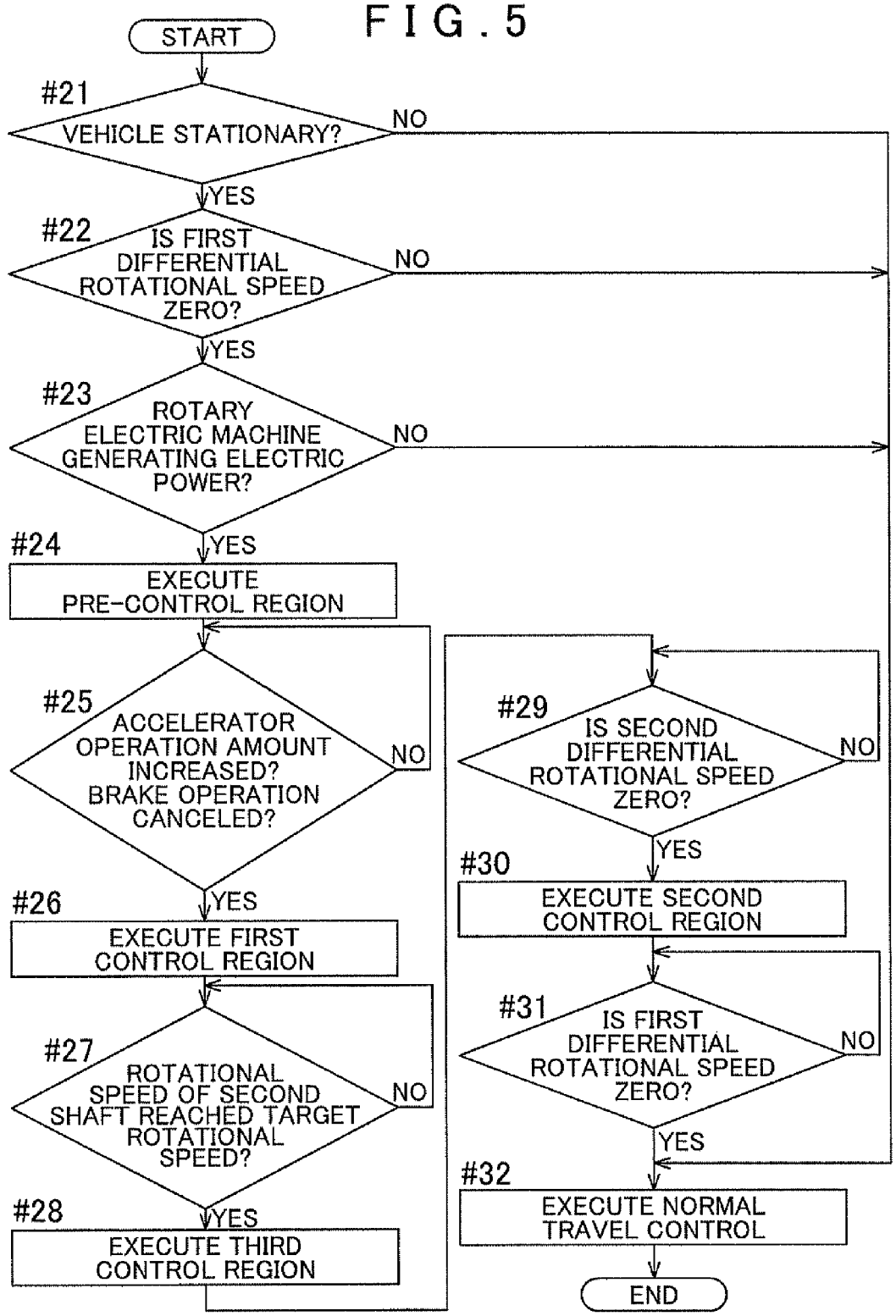
FIG. 5 is a flowchart showing the process procedures of specific starting control according to the second embodiment.

Next, the process procedures of the specific starting control performed by the control device 3 according to the present embodiment will be described. FIG. 5 is a flowchart showing the process procedures of the specific starting control according to the present embodiment. As can be well understood by comparing the flowchart of FIG. 5 and the flowchart of FIG. 3 for the first embodiment described above, the process procedures of the specific starting control according to the present embodiment and the process procedures of the specific starting control according to the first embodiment described above are mostly common to each other. That is, the content of the processes of step #21 to step #26 in the specific starting control according to the present embodiment is the same as the content of the processes of step #01 to step #06 in the specific starting control according to the first embodiment described above. In addition, the content of the processes of step #29 to step #32 in the specific starting control according to the present embodiment is the same as the content of the processes of step #07 to step #10 in the specific starting control according to the first embodiment described above. That is, in the specific starting control according to the present embodiment, the processes of step #27 and step #28 are added between step #06 and step #07 in the specific starting control according to the first embodiment described above. The added processes and the preceding and subsequent processes will be mainly described below.

As shown in FIG. 5, if it is determined in step #25 that a starting operation has been made (step #25: Yes), substantial control of the specific starting control to which the present invention is directed is started. That is, the first control region D1 is first executed (step #26). The content of control performed by the specific starting control section 47 etc. in the first control region D1 is as described above. In the first control region D1, the specific starting control section 47 monitors whether or not the rotational speed of the intermediate shaft M has reached the target rotational speed Nt (step #27). In the present embodiment, as described above, the target rotational speed Nt is set to the first target rotational speed Nt1 at which the oil pump 24 can secure a supply hydraulic pressure required for all the engagement devices (including the input clutch CT and the first clutch C1). Then, if it is determined that the rotational speed of the intermediate shaft M has reached the first target rotational speed Nt1 (step #27: Yes), the third control region D3 is executed next (step #28). The content of control performed by the specific starting control section 47 etc. in the third control region D3 is as described above. In the third control region D3, the specific starting control section 47 monitors whether or not the second differential rotational speed ΔN2 has been eliminated (whether or not the second differential rotational speed ΔN2 has become zero) (step #29). Then, if it is determined that the second differential rotational speed ΔN2 has been eliminated (step #27: Yes), the second control region D2 and the normal control region DN are executed thereafter (step #28 to step #32) to terminate the specific starting control.

3. Third Embodiment

A control device according to a third embodiment of the present invention will be described with reference to the drawings. The configuration of the drive train of the drive device 1 and the configuration of the control device 3 according to the present embodiment are basically the same as those according to each of the embodiments described above. The specific content of the specific starting control executed by the specific starting control section 47 etc. is partially different from that according to each of the embodiments described above. The differences between the control device 3 according to the present embodiment and that according to each of the embodiments described above will be mainly described below. The same elements as those in each of the embodiments will not be specifically described.

3-1. Content of Specific Starting Control

Figure 6:
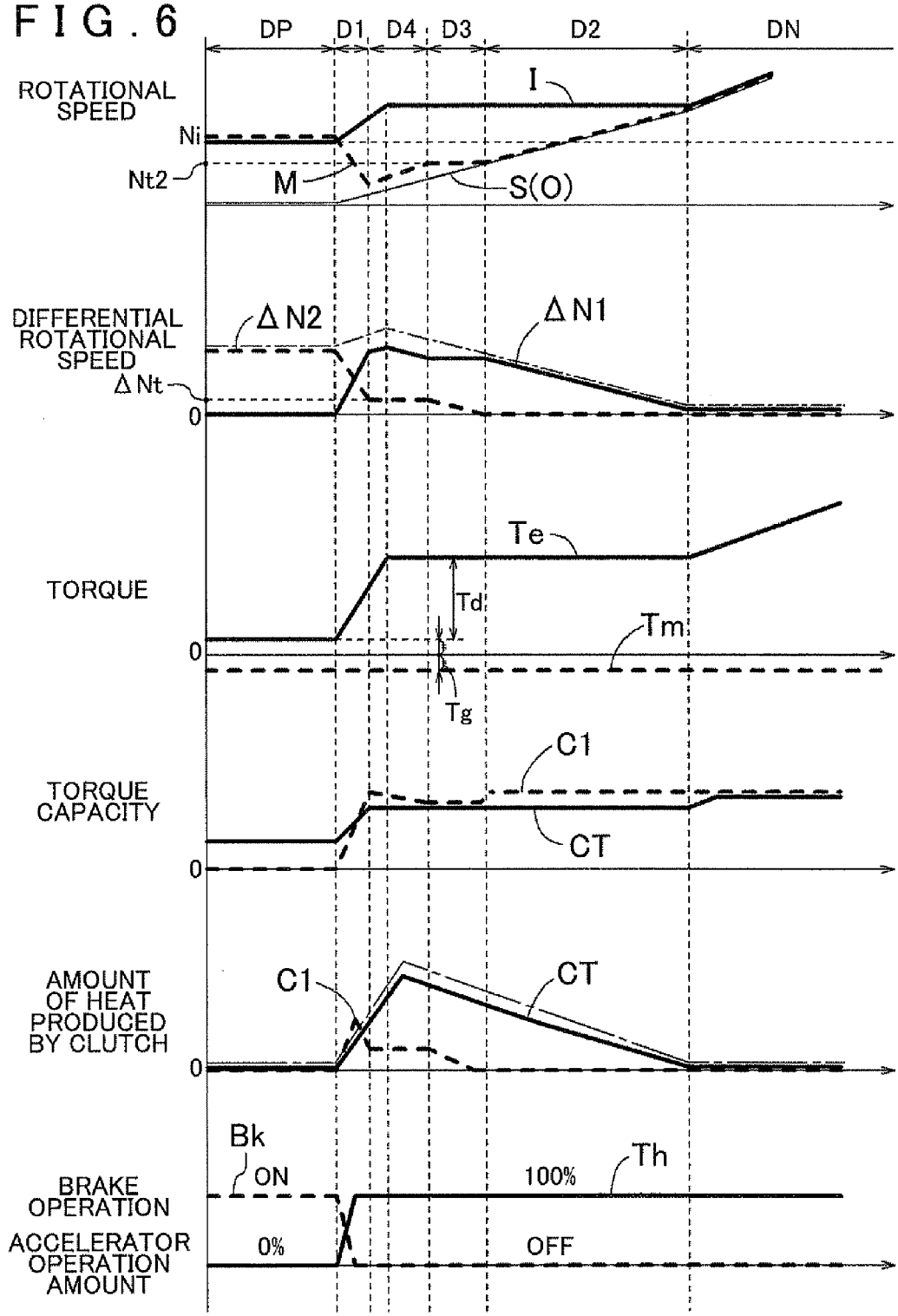
FIG. 6 is a time chart showing the operating states of various components during specific starting control according to a third embodiment.

The specific starting control according to the present embodiment will be described in detail below. FIG. 6 is a time chart showing the operating states of various components of the vehicle during the specific starting control according to the present embodiment. Also in the drawing, as in the first embodiment described above, the respective rotational speeds of the internal combustion engine 11, the rotary electric machine 12, and the transmission intermediate shaft S (output shaft O), the first differential rotational speed ΔN1 and the second differential rotational speed ΔN2, the respective output torques of the internal combustion engine 11 and the rotary electric machine 12, the respective torque capacities (engagement pressures) of the input clutch CT and the first clutch C1, the respective amounts of heat produced by the input clutch CT and the first clutch C1, and the accelerator operation amount and the brake operation are shown in this order from the top.

As shown in FIG. 6, the specific starting control according to the present embodiment is provided with four control regions, namely a first control region D1, a second control region D2, a third control region D3, and a fourth control region D4 performed in the event of the specific starting operation. The second control region D2 is executed after the first control region D1. The third control region D3 is executed between the first control region D1 and the second control region D2. The fourth control region D4 is executed between the first control region D1 and the third control region D3. A pre-control region DP is executed before the first control region D1. A normal control region DN is executed after the second control region D2. Hence, in the specific starting control according to the present embodiment, six control regions, namely the pre-control region DP, the first control region D1, the fourth control region D4, the third control region D3, the second control region D2, and the normal control region DN, are performed in this order in the event of the specific starting operation. The control regions will be described below in order.

The pre-control region DP is a preliminary control region performed before the substantial specific starting control is performed. In the electric power generation mode selected in the pre-control region DP, the input clutch CT is maintained in the completely engaged state, and the input clutch CT is in a state in which the input clutch CT transfers a drive force while providing no first differential rotational speed ΔN1 (with the first differential rotational speed ΔN1 being zero). In this state, the rotary electric machine 12 generates electric power using torque of the internal combustion engine 11. At this time, the input clutch CT is maintained in the completely engaged state, and maintained in a state in which the input clutch CT provides no first differential rotational speed ΔN1. Meanwhile, the first clutch C1 is maintained in the disengaged state, and the first clutch C1 provides a significant second differential rotational speed ΔN2 while transferring no drive force. In the pre-control region DP, the specific starting control section 47 monitors a driver's starting operation. When a starting operation performed by the driver is sensed by the specific starting control section 47, substantial control (in the present embodiment, the first control region D1, the fourth control region D4, the third control region D3, and the second control region D2) of the specific starting control is started.

The first control region D1 is a control region performed in the initial stage of the specific starting control. In the first control region D1, the first differential rotational speed ΔN1 is increased gradually (in the example, at a constant time variation rate) with the input clutch CT in the slip engagement state, and the second differential rotational speed ΔN2 is decreased gradually (in the example, at a constant time variation rate). In the first control region D1, the vehicle required torque Td and the internal combustion engine required torque are increased in accordance with an operation to depress the accelerator pedal 17 performed by the driver of the vehicle 6, and the internal combustion engine torque Te is increased accordingly. The rotational speed of the internal combustion engine 11 and the input shaft I is also raised. In the example, the rotary electric machine torque Tm (=−Tg) is maintained at the same constant value. In this state, the input clutch operation control section 44 gradually increases the supply hydraulic pressure for the input clutch CT to a predetermined pressure less than the engagement boundary pressure via the hydraulic pressure control device 25 to bring the input clutch CT into the slip engagement state. In addition, the speed change mechanism operation control section 45 gradually increases the supply hydraulic pressure for the first clutch C1 to a predetermined pressure less than the engagement boundary pressure via the hydraulic pressure control device 25 to bring the input clutch CT into the slip engagement state.

In the first control region D1, the hydraulic pressure to be supplied to the first clutch C1 is increased to a predetermined pressure less than the engagement boundary pressure, which causes the rotational speed of the intermediate shaft M to be reduced by a travel resistance transferred via the wheels 15, the output shaft O, the transmission intermediate shaft S, and the first clutch C1. At this time, in the present embodiment, the input clutch operation control section 44 controls the supply hydraulic pressure for the first clutch C1 so as to reduce the rotational speed of the intermediate shaft M such that the second differential rotational speed ΔN2 reaches a target differential rotational speed ΔNt. In the present embodiment, the target differential rotational speed ΔNt is set to a predetermined constant value, that is, a value equal to or more than zero that enables recognition of a predetermined differential rotational speed between the rotational speed of the intermediate shaft M and the rotational speed of the transmission intermediate shaft S. In the illustrated example, the target differential rotational speed ΔNt is set to a value of about 20 to 30% of the idle rotational speed Ni.

Meanwhile, the rotational speed of the input shaft I is raised as described above, and the rotational speed of the transmission intermediate shaft S is raised gently in proportion to the vehicle speed. Accordingly, in the first control region D1 of the specific starting control according to the present embodiment, the specific starting control section 47 etc. decreases the second differential rotational speed ΔN2, and increases the first differential rotational speed ΔN1. At this time, the period (time) of the first control region D1 in the present embodiment is substantially the same as the period (time) of the first control region D1 in the first embodiment described above. Therefore, in the present embodiment, the second differential rotational speed ΔN2 is decreased relatively gently, and the first differential rotational speed ΔN1 is increased relatively gently, compared to the first embodiment described above. The rotational speed of the intermediate shaft M at the time point when the second differential rotational speed ΔN2 reaches the target differential rotational speed ΔNt is sufficiently lower than the first target rotational speed Nt1 in the second embodiment described above. Therefore, in the present embodiment, compared to the second embodiment described above, the second differential rotational speed ΔN2 is decreased relatively rapidly, and the first differential rotational speed ΔN1 is increased relatively rapidly. In the first control region D1, in addition, the specific starting control section 47 monitors whether or not the second differential rotational speed ΔN2 has reached the target differential rotational speed ΔNt. The first control region D1 is executed until the second differential rotational speed ΔN2 reaches the target differential rotational speed ΔNt. When the second differential rotational speed ΔN2 becomes equal to the target differential rotational speed ΔNt, the fourth control region D4 is started next.

The fourth control region D4 is a control region performed in the intermediate stage of the specific starting control according to the present embodiment. In the fourth control region D4, with the rotational speed of the output shaft O and the rotational speed of the transmission intermediate shaft S, which is proportional to the rotational speed of the output shaft O, rising, the rotational speed of the intermediate shaft M is raised in accordance with the rise in rotational speed of the output shaft and rotational speed of the transmission intermediate shaft S to maintain the second differential rotational speed ΔN2 at the target differential rotational speed ΔNt. In the fourth control region D4, except in the initial stage of the fourth control region D4, the internal combustion engine torque Te is maintained at a constant value that is not varied over time, and the rotational speed of the internal combustion engine 11 and the input shaft I is also maintained at a constant value that is not varied over time. The input clutch operation control section 44 maintains the supply hydraulic pressure for the input clutch CT, which has been increased to a predetermined pressure via the hydraulic pressure control device 25 in the first control region D1, basically at the same constant value to maintain the input clutch CT in the slip engagement state. In the fourth control region D4, in addition, the speed change mechanism operation control section 45 gradually slightly decreases the supply hydraulic pressure for the first clutch C1 to maintain the second differential rotational speed ΔN2 at the target differential rotational speed ΔNt. Then, the rotational speed of the intermediate shaft M is raised gently in accordance with a rise in rotational speed of the transmission intermediate shaft S which is raised gently in proportion to the vehicle speed. Accordingly, in the fourth control region D4 of the specific starting control according to the present embodiment, the specific starting control section 47 etc. gently decreases the first differential rotational speed ΔN1 except in the initial stage of the fourth control region D4, and maintains the second differential rotational speed ΔN2 at a constant value that is not varied over time.

In this event, also in the present embodiment, the internal combustion engine control section 31 performs operation control of the internal combustion engine 11 so as to output the internal combustion engine torque Te (=Td+Tg) with a magnitude equivalent to a portion of the drive torque corresponding to the vehicle required torque Td to be carried by the internal combustion engine 11 on the basis of the internal combustion engine required torque decided by the required torque decision section 42. In the present embodiment, in this state, the input clutch operation control section 44 controls the supply hydraulic pressure for the input clutch CT via the hydraulic pressure control device 25 such that the transfer torque capacity Tct of the input clutch CT reaches a value equivalent to the internal combustion engine torque Te (=Td+Tg) corresponding to the internal combustion engine required torque. By performing such feedforward control on the supply hydraulic pressure for the input clutch CT, it is possible to appropriately transfer the internal combustion engine torque Te output from the internal combustion engine 11 to the wheels 15 side via the input clutch CT. Such operation control of the internal combustion engine 11 and the input clutch CT is performed continuously also in the third control region D3 and the second control region D2 executed after the fourth control region D4.

In the fourth control region D4, in addition, the specific starting control section 47 monitors whether or not the rotational speed of the intermediate shaft M has reached the predetermined target rotational speed Nt. In the present embodiment, the target rotational speed Nt is set to a predetermined constant value, that is, a second target rotational speed Nt2 higher than the rotational speed of the transmission intermediate shaft S at the start of the fourth control region D4 and lower than the rotational speed of the input shaft I. In the illustrated example, the second target rotational speed Nt2 is set to a value of about 60 to 70% of the idle rotational speed Ni. The fourth control region D4 is executed until the rotational speed of the intermediate shaft M reaches the second target rotational speed Nt2. When the rotational speed of the intermediate shaft M reaches the second target rotational speed Nt2, the speed change mechanism operation control section 45 maintains the supply hydraulic pressure for the first clutch C1 at a constant value that is not varied over time via the hydraulic pressure control device 25, and the third control region D3 is started next. The content of control performed in the third control region D3 and the subsequent second control region D2 and normal control region DN is the same as that according to the second embodiment described above except for the specific setting of the target rotational speed Nt (second target rotational speed Nt2≠first target rotational speed Nt1), and thus is not described in detail here.

In this way, in the specific starting control according to the present embodiment, the first control region D1 and the fourth control region D4, the third control region D3, and the second control region D2 executed after the first control region D1 are performed in the event of the specific starting operation in which the vehicle 6 is started with the rotary electric machine 12 continuously generating electric power from a state in which the rotary electric machine 12 generates electric power with the input clutch CT in the completely engaged state CT and in which the first clutch C1 is in the disengaged state. This allows the vehicle 6 to be started with the rotary electric machine 12 continuously maintained in the electric power generating state while bringing the input clutch CT into the slip engagement state to gradually decrease the second differential rotational speed ΔN2 and to gradually increase the first differential rotational speed ΔN1 in the first control region D1. Further, after the second differential rotational speed ΔN2 is eliminated to completely engage the first clutch C1 in the fourth control region D4 to the third control region D3, the first differential rotational speed ΔN1 is gradually decreased until the first differential rotational speed ΔN1 is eliminated to completely engage the input clutch CT in the second control region D2. In such specific starting control, the second differential rotational speed ΔN2 is gradually decreased in the first control region D1 to the third control region D3. Thus, it is possible to reduce the amount of slip of the first clutch C1 to reduce the amount of heat produced by the first clutch C1. Hence, it is possible to suppress overheating of the first clutch C1 to suppress a reduction in durability of the first clutch C1. In addition, it is possible to appropriately transfer the internal combustion engine torque Te to the wheels 15 side via the input clutch CT in the event of the specific starting operation, and thus to secure a sufficient drive force for driving the vehicle 6.

In the present embodiment, in addition, the second differential rotational speed ΔN2 is temporarily maintained at the predetermined target differential rotational speed ΔNt in the fourth control region D4, which allows the second differential rotational speed ΔN2 to be reduced relatively quickly. Then, in the third control region D3 performed thereafter, the rotational speed of the intermediate shaft M is maintained at the predetermined target rotational speed Nt (in the example, a second target rotational speed Nt2), which suppresses generation of a shock at the time point when the second differential rotational speed ΔN2 is eliminated. Thus, the specific starting control according to the present embodiment makes it possible to suppress generation of a shock at the time point when the second differential rotational speed ΔN2 is eliminated while effectively reducing the amount of heat produced by the first clutch C1 to effectively suppress a reduction in durability of the first clutch C1. In addition, it is possible to maintain the rotary electric machine 12 in the electric power generating state to accumulate a sufficient amount of electric power accumulated in the electricity accumulation device 28.

3-2. Process Procedures of Specific Starting Control

Figure 7:
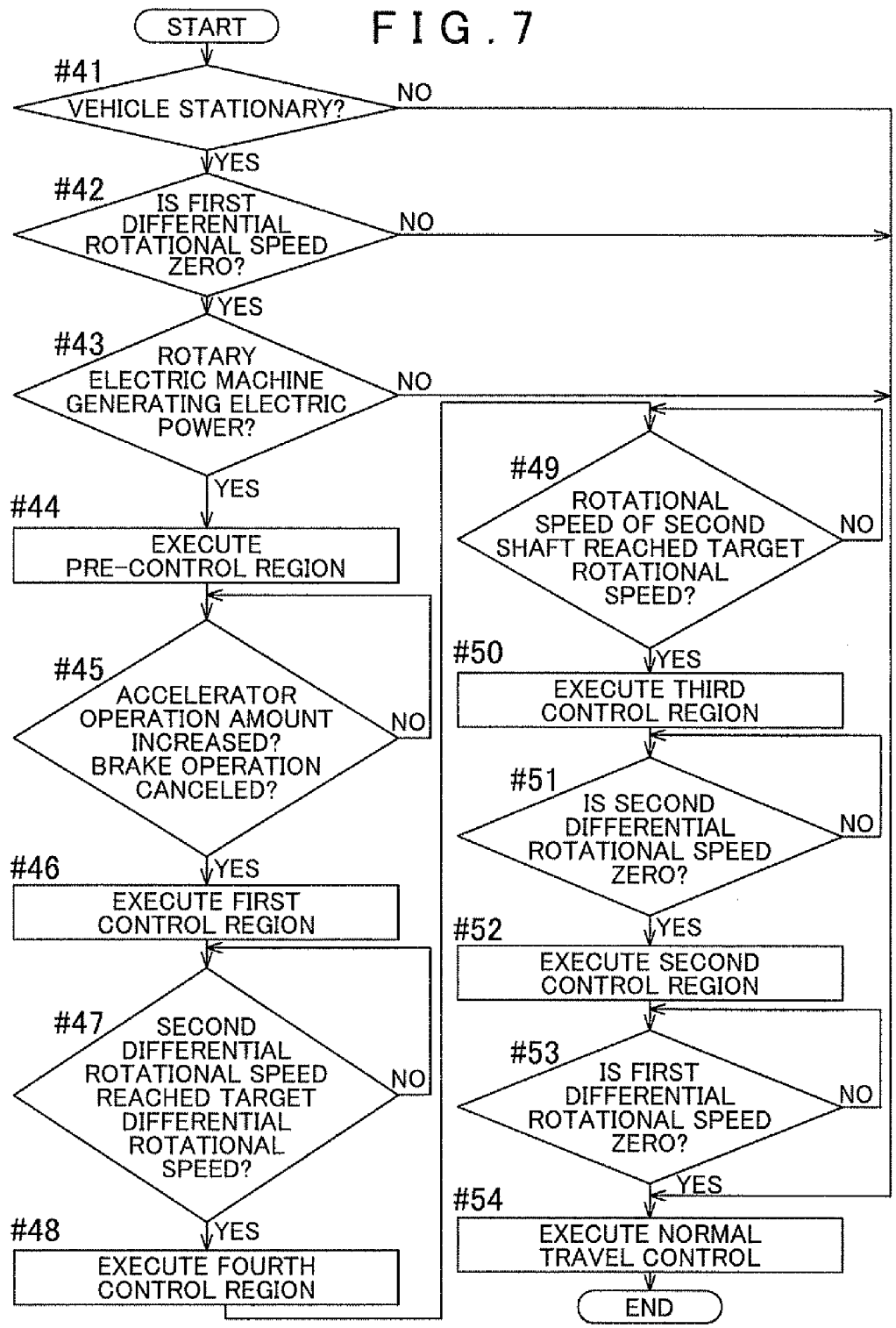
FIG. 7 is a flowchart showing the process procedures of specific starting control according to the third embodiment.

Next, the process procedures of the specific starting control performed by the control device 3 according to the present embodiment will be described. FIG. 7 is a flowchart showing the process procedures of the specific starting control according to the present embodiment. As can be well understood by comparing the flowchart of FIG. 7 and the flowchart of FIG. 5 for the second embodiment described above, the process procedures of the specific starting control according to the present embodiment and the process procedures of the specific starting control according to the second embodiment described above are mostly common to each other. That is, the content of the processes of step #41 to step #46 in the specific starting control according to the present embodiment is the same as the content of the processes of step #21 to step #26 in the specific starting control according to the second embodiment described above. In addition, the content of the processes of step #49 to step #54 in the specific starting control according to the present embodiment is the same as the content of the processes of step #27 to step #32 in the specific starting control according to the second embodiment described above. That is, in the specific starting control according to the present embodiment, the processes of step #47 and step #48 are added between step #26 and step #27 in the specific starting control according to the second embodiment described above. The added processes and the preceding and subsequent processes will be mainly described below.

As shown in FIG. 7, if it is determined in step #45 that a starting operation has been made (step #45: Yes), substantial control of the specific starting control to which the present invention is directed is started. That is, the first control region D1 is first executed (step #46). The content of control performed by the specific starting control section 47 etc. in the first control region D1 is as described above. In the first control region D1, the specific starting control section 47 monitors whether or not the second differential rotational speed ΔN2 has reached the target differential rotational speed ΔNt (step #47). Then, if it is determined that the second differential rotational speed ΔN2 has reached the target differential rotational speed ΔNt (step #47: Yes), the fourth control region D4 is executed next (step #48). The content of control performed by the specific starting control section 47 etc. in the fourth control region D4 is as described above. In the fourth control region D4, the specific starting control section 47 monitors whether or not the rotational speed of the intermediate shaft M has reached the target rotational speed Nt (in the example, the second target rotational speed Nt2) (step #49). Then, if it is determined that the rotational speed of the intermediate shaft M has reached the second target rotational speed Nt2 (step #49: Yes), the third control region D3, the second control region D2, and the normal control region DN are executed thereafter (step #50 to step #54) to terminate the specific starting control.

4. Fourth Embodiment

A control device according to a fourth embodiment of the present invention will be described with reference to the drawing. The configuration of the drive train of the drive device 1 and the configuration of the control device 3 according to the present embodiment are basically the same as those according to each of the embodiments described above. The specific content of the specific starting control according to the present embodiment is similar to, but partially different from, that according to the second embodiment described above. The differences between the drive device 1 according to the present embodiment and that according to the second embodiment described above will be mainly described below. The same elements as those in the above second embodiment will not be specifically described.

Figure 8:
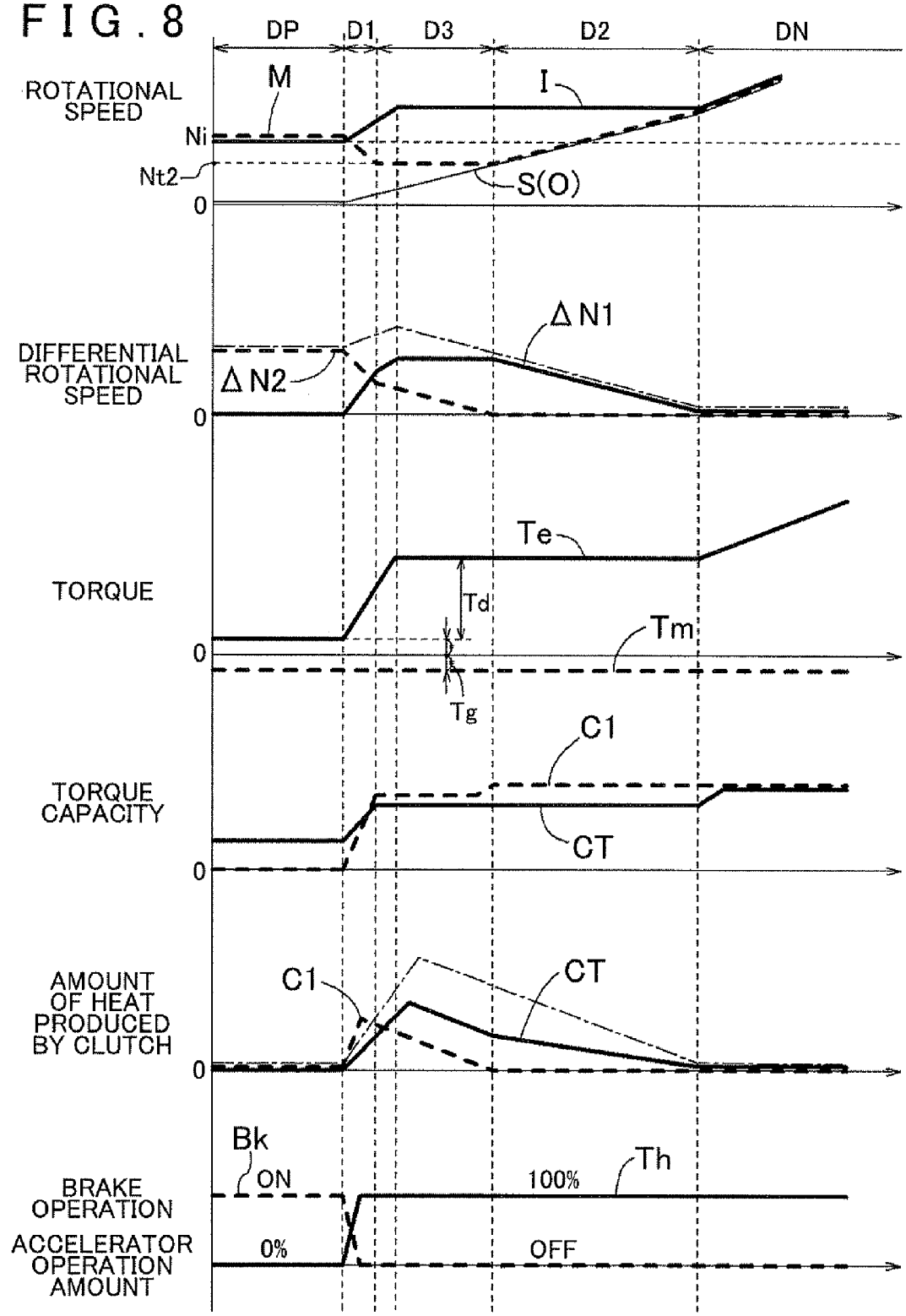
FIG. 8 is a time chart showing the operating states of various components during specific starting control according to a fourth embodiment.

FIG. 8 is a time chart showing the operating states of various components of the vehicle during the specific starting control according to the present embodiment. As shown in FIG. 8, the specific starting control according to the present embodiment is provided with three control regions, namely a first control region D1, a second control region D2, and a third control region D3 performed in the event of the specific starting operation. In the specific starting control according to the present embodiment, five control regions, namely the pre-control region DP, the first control region D1, the third control region D3, the second control region D2, and the normal control region DN, are performed in this order in the event of the specific starting operation.

Also in the present embodiment, as in the second embodiment described above, in the first control region D1, the input clutch operation control section 44 controls the supply hydraulic pressure for the first clutch C1 so as to reduce the rotational speed of the intermediate shaft M to a predetermined target rotational speed Nt. In the present embodiment, the target rotational speed Nt is set to a predetermined constant value that is irrelevant to a rotational speed at which the oil pump 24 can secure a supply hydraulic pressure required for all the engagement devices including the input clutch CT and the first clutch C1, that is, a second target rotational speed Nt2 higher than the rotational speed of the transmission intermediate shaft S in the final stage of the first control region D1 and lower than the rotational speed of the input shaft I. The second target rotational speed Nt2 according to the example is the same as the target rotational speed Nt according to the second embodiment described above, and set to a value of about 60 to 70% of the idle rotational speed Ni. If the second target rotational speed Nt2 is set to such a value, the supply hydraulic pressure required for all the engagement devices including the input clutch CT and the first clutch C1 may not be secured by only the oil pump 24 driven to rotate at the second target rotational speed Nt2. Hence, in the present embodiment, as in the first embodiment described above, the drive device 1 includes an electric oil pump serving as an additional hydraulic pressure source that can be actuated independently of the internal combustion engine 11 and the rotary electric machine 12 serving as drive force sources for the vehicle 6.

In the first control region D1, in addition, the specific starting control section 47 monitors whether or not the rotational speed of the intermediate shaft M has reached the second target rotational speed Nt2 described above. The first control region D1 is executed until the rotational speed of the intermediate shaft M reaches the second target rotational speed Nt2. When the rotational speed of the intermediate shaft M becomes equal to the second target rotational speed Nt2, the third control region D3 and the normal control region DN are executed thereafter.

Also in the present embodiment, as in the second embodiment described above, it is possible to maintain the rotary electric machine 12 in the electric power generating state to accumulate a sufficient amount of electric power in the electricity accumulation device 28 while suppressing overheating of the first clutch C1 to suppress a reduction in durability of the first clutch C1 in the event of the specific starting operation. Further, it is possible to secure a sufficient drive force for driving the vehicle 6. In addition, it is possible to suppress generation of a shock at the time point when the second differential rotational speed ΔN2 is eliminated.

5. Fifth Embodiment

A control device according to a fifth embodiment of the present invention will be described with reference to the drawing. The configuration of the drive train of the drive device 1 and the configuration of the control device 3 according to the present embodiment are basically the same as those according to each of the embodiments described above. The specific content of the specific starting control according to the present embodiment is similar to, but partially different from, that according to the first embodiment described above. The differences between the drive device 1 according to the present embodiment and that according to the first embodiment described above will be mainly described below. The same elements as those according to the first embodiment described above will not be specifically described.

FIG. 9 is a time chart showing the operating states of various components of the vehicle during the specific starting control according to the present embodiment. As shown in FIG. 9, the specific starting control according to the present embodiment is provided with two control regions, namely a first control region D1 and a second control region D2, performed in the event of the specific starting operation. In the specific starting control according to the present embodiment, four control regions, namely the pre-control region DP, the first control region D1, the second control region D2, and the normal control region DN, are performed in this order in the event of the specific starting operation.

In the present embodiment, in the first control region D1, the internal combustion engine control section 31 and the rotary electric machine control section 43 perform operation control of the internal combustion engine 11 and the rotary electric machine 12, respectively, irrespective of the vehicle required torque Td decided on the basis of the vehicle speed and the accelerator operation amount until the second differential rotational speed ΔN2 is eliminated to bring the first clutch C1 into the completely engaged state, even if the driver of the vehicle 6 has made an operation to depress the accelerator pedal 17. More specifically, the internal combustion engine control section 31 and the rotary electric machine control section 43 perform operation control of the internal combustion engine 11 and the rotary electric machine 12, respectively, so as to transfer creep torque Tcr for causing the vehicle 6 to creep to the wheels 15. That is, operation control of the internal combustion engine 11 and the rotary electric machine 12 is performed through cooperation between the internal combustion engine control section 31 and the rotary electric machine control section 43 such that the sum of the internal combustion engine torque Te (=−Tcr+Tg) and the rotary electric machine torque Tm (=−Tg) becomes equal to the creep torque Tcr, rather than the vehicle required torque Td. In the example, the rotary electric machine torque Tm (=−Tg) which has been output for the rotary electric machine 12 to generate electric power with the vehicle 6 stationary is maintained at the same constant value also during the specific starting control.

That is, when the driver of the vehicle 6 has made an operation to depress the accelerator pedal 17, the internal combustion engine torque Te is increased accordingly to achieve a portion of the creep torque Tcr to be carried by the internal combustion engine 11. In the present embodiment, the rotary electric machine 12 is supplied with the electric power generation torque Tg to generate electric power during the specific starting control. Thus, the "portion of the creep torque Tcr to be carried by the internal combustion engine 11" matches the sum of the creep torque Tcr and the electric power generation torque Tg (Te=Td+Tg). In addition, the rotational speed of the internal combustion engine 11 and the input shaft I is raised to a rotational speed required for the internal combustion engine 11 to output the portion of the creep torque Tcr to be carried by the internal combustion engine 11. In this state, the input clutch operation control section 44 gradually increases the supply hydraulic pressure for the input clutch CT to a predetermined pressure less than the engagement boundary pressure via the hydraulic pressure control device 25 to bring the input clutch CT into the slip engagement state. In addition, the speed change mechanism operation control section 45 gradually increases the supply hydraulic pressure for the first clutch C1 to the complete engagement pressure via the hydraulic pressure control device 25 to bring the first clutch C1 into the completely engaged state.

In the first control region D1, in addition, the specific starting control section 47 monitors whether or not the second differential rotational speed ΔN2 of the first clutch C1 has been eliminated (the second differential rotational speed ΔN2 has become zero). The first control region D1 is executed until the second differential rotational speed ΔN2 is eliminated.

When the second differential rotational speed $\Delta N2$ is eliminated, the second control region D2 is started next. In the second control region D2, the internal combustion engine torque Te is raised until reaching a value corresponding to the internal combustion engine required torque decided on the basis of the vehicle required torque Td. Accordingly, the rotational speed of the internal combustion engine 11 is also raised to a rotational speed required for the internal combustion engine 11 to output the internal combustion engine torque Te (=Td+Tg) corresponding to the internal combustion engine required torque. In this state, the second control region D2 is executed, and the normal control region DN is executed further thereafter.

Also in the present embodiment, as in the first embodiment described above, it is possible to maintain the rotary electric machine 12 in the electric power generating state to accumulate a sufficient amount of electric power in the electricity accumulation device 28 while effectively suppressing overheating of the first clutch C1 to effectively suppress a reduction in durability of the first clutch C1 in the event of the specific starting operation. Further, it is possible to secure a sufficient drive force for driving the vehicle 6. In the present embodiment, in addition, in the first control region D1, the internal combustion engine 11 and the rotary electric machine 12 are controlled such that the sum of the internal combustion engine torque Te and the rotary electric machine torque Tm becomes equal to the creep torque Ter, rather than the vehicle required torque Td, and the transfer torque capacity Tct of the input clutch CT is controlled to a value substantially equal to the portion of the creep torque Ter to be carried by the internal combustion engine 11. This allows the vehicle 6 to appropriately creep. In this case, in addition, the upper limit value of torque transferred to the wheels 15 side via the first clutch C1 is equal to the creep torque Ter set to a relatively small value. Therefore, the amount of heat produced by the first clutch C1, which is determined in accordance with the product of the magnitude of torque transferred via the first clutch C1 and the second differential rotational speed $\Delta N2$, can be further reduced. Hence, by executing the specific starting control according to the present embodiment, it is possible to effectively suppress overheating of the first clutch C1 to further effectively suppress a reduction in durability of the first clutch C1.

6. Other Embodiments

Lastly, control devices according to other embodiments of the present invention will be described. A characteristic configuration disclosed in each of the following embodiments may be applied not only to that particular embodiment but also in combination with a characteristic configuration disclosed in any other embodiment unless any contradiction occurs.

(1) In each of the embodiments described above, the specific starting mode is selected when the vehicle 6 is to be started so that the specific starting control is executed at all times. However, embodiments of the present invention are not limited thereto. That is, in one preferred embodiment of the present invention, the specific starting control is executed only in the case where predetermined selective execution conditions are established in the event of the specific starting operation. Examples of such selective execution conditions include various types of conditions such as conditions based on external factors such as the road surface gradient and conditions based on internal factors such as the temperature of the first clutch C1. More specifically, the gradient of a road surface on which the vehicle 6 is stationary may be detected by a gradient sensor provided in the vehicle 6, for example, and the specific starting control may be executed only in the case where the detected road surface gradient is equal to or more than a predetermined reference value (set gradient threshold). Alternatively, the temperature of the first clutch C1 may be detected by a temperature sensor provided in the vehicle 6, for example, and the specific starting control may be executed only in the case where the detected temperature of the first clutch C1 is equal to or more than a predetermined reference value (set temperature threshold). The temperature of the first clutch C1 may not be actually measured as described above, and may be estimated on the basis of the second differential rotational speed $\Delta N2$ and the magnitude of torque transferred via the first clutch C1, for example. Still alternatively, the amount of electric power accumulated in the electricity accumulation device 28 may be detected by the charge state detection sensor Se6 provided in the vehicle 6, for example, and the specific starting control may be executed only in the case where the detected amount of electric power accumulated in the electricity accumulation device 28 is equal to or less than a predetermined reference value (set accumulated electric power amount threshold). In the case where the selective execution conditions are not established in such cases, the vehicle 6 may be started in the electric power travel mode with the input clutch CT in the disengaged state and with the first clutch C1 in the completely engaged state, for example.

(2) In the second embodiment described above, the target rotational speed Nt is set to the first target rotational speed Nt1 at which the oil pump 24 can secure a supply hydraulic pressure required for all the engagement devices including the input clutch CT and the first clutch C1. In the third and fourth embodiments described above, the target rotational speed Nt is set to the predetermined second target rotational speed Nt2. However, embodiments of the present invention are not limited thereto. That is, the target rotational speed Nt may be set to a desired value more than the rotational speed of the transmission intermediate shaft S and less than the rotational speed of the input shaft I in accordance with the characteristics of the drive device 1 and the vehicle 6 or the like. Likewise, the target differential rotational speed $\Delta Nt$ described in relation to the third embodiment described above may be set to a desired value equal to or more than zero that enables recognition of a differential rotational speed between the rotational speed of the intermediate shaft M and the rotational speed of the transmission intermediate shaft S in accordance with the characteristics of the drive device 1 and the vehicle 6 or the like.

(3) In this case, in one preferred embodiment of the present invention, the target rotational speed Nt for the third control region D3 is decided on the basis of at least the required amount of generated electric power. Here, the required amount of generated electric power is a target value for the amount of electric power to be generated by the rotary electric machine 12 when the rotary electric machine 12 generates electric power. The required amount of generated electric power may be decided on the basis of the amount of electric power accumulated in the electricity accumulation device 28 detected by the charge state detection sensor Se6, power consumption of electrically-driven accessories provided in the vehicle 6 (such as a compressor of an in-vehicle air conditioner and lamps, for example), or the like, for example. Then, the target rotational speed Nt may be decided on the basis of the required amount of generated electric power and a constraint imposed on the magnitude of the electric power generation torque Tg to suppress the amount of heat produced by the rotary electric machine 12 to a predetermined amount or less. In this case, as described above in relation to the second embodiment, the target rotational speed Nt may be decided also in consideration of the fact that the oil pump 24 should secure a supply hydraulic pressure required for all the engagement devices including the input clutch CT and the first clutch C1. Further, the target rotational speed Nt may be decided also in consideration of the amount of heat produced by one or both of the input clutch CT and the first clutch C1.

(4) In the third embodiment described above, the predetermined target differential rotational speed ΔNt is set to a predetermined constant value. However, embodiments of the present invention are not limited thereto. That is, in one preferred embodiment of the present invention, the target differential rotational speed ΔNt is set to a value determined by a function (for example, a linear function) of the rotational speed of the transmission intermediate shaft S, which is an engagement member on the downstream side of the first clutch C1 in the power transfer path, for example. In this case, a function that makes the target differential rotational speed ΔNt zero when the vehicle speed is raised to a predetermined speed may be used. Then, the fourth control region D4 is immediately followed by the second control region D2, rather than the third control region D3, unlike the third embodiment described above. That is, in one preferred embodiment of the present invention, by using such a target differential rotational speed ΔNt, five control regions, namely the pre-control region DP, the first control region D1, the fourth control region D4, the second control region D2, and the normal control region DN, are performed in this order in the event of the specific starting control.

(5) In each of the embodiments described above, the first speed established with the first clutch C1 and the one-way clutch (not shown) in the engaged state is established as the starting shift speed with which the vehicle 6 is started, and the amount of heat produced by the first clutch C1 is reduced by executing the specific starting control. However, embodiments of the present invention are not limited thereto. That is, in one preferred embodiment of the present invention, a shift speed established with another friction engagement device (for example, a second clutch, a brake, or the like) provided in the speed change mechanism 13 in the engaged state is established as the starting shift speed, for example, and the amount of heat produced by the second clutch or the like is reduced by executing the specific starting control. In this case, the second clutch or the like corresponds to the "starting engagement device" according to the present invention, and also corresponds to the "second engagement device". In the case where the second engagement device (starting engagement device) is a brake provided in the speed change mechanism 13, a non-rotary member such as a drive device case is coupled to an engagement member on one side of the brake so that the rotational speed of the engagement member is zero at all times.

(6) In each of the embodiments described above, the rotary electric machine 12 outputs constant rotary electric machine torque Tm (=−Tg) for electric power generation at all times in each of the control regions of the specific starting control. However, embodiments of the present invention are not limited thereto. That is, in one preferred embodiment of the present invention, in the case where the third control region D3 is executed in the specific starting control, for example, the rotary electric machine 12 positively outputs torque for promoting variations in rotational speed, in addition to the rotary electric machine torque Tm for electric power generation, such that the rotational speed of the intermediate shaft M matches the target rotational speed Nt more quickly. In this event, the second differential rotational speed ΔN2 of the first clutch C1 may be varied in accordance with the rotational speed of the rotary electric machine 12 which rotates together with the intermediate shaft M. Thus, it is suitable that the supply hydraulic pressure for the first clutch C1 is controlled such that torque transferred to the output shaft O matches the vehicle required torque Td. In this case, in the first control region D1 serving as the differential rotational speed control region, the rotary electric machine 12 is controlled to a rotational speed matching the predetermined target rotational speed Nt, the supply hydraulic pressure for the input clutch CT is controlled such that the first differential rotational speed ΔN1 reaches a predetermined target rotational speed, and the supply hydraulic pressure for the first clutch C1 is controlled such that torque transferred to the output shaft O matches the vehicle required torque Td. Further, the specific starting control section 47 outputs the internal combustion engine required torque, which is provided as an internal combustion engine control command for the internal combustion engine 11 to output torque matching the sum of the electric power generation torque Tg and the vehicle required torque Td provided to the rotary electric machine 12, to the internal combustion engine control section 31 via the required torque decision section 42, so that the internal combustion engine 11 is controlled in accordance with the internal combustion engine required torque. Also in the case where no third control region D3 is provided, the rotary electric machine 12 may positively output torque for promoting variations in rotational speed, in addition to the rotary electric machine torque Tm for electric power generation, in order to quickly reduce the rotational speed of the intermediate shaft M to quickly decrease the second differential rotational speed ΔN2.

(7) In each of the embodiments described above, the rotational speed of the intermediate shaft M is reduced in the first control region D1. However, embodiments of the present invention are not limited thereto. That is, it is possible to gradually increase the first differential rotational speed ΔN1 and to gradually decrease the second differential rotational speed ΔN2 in the first control region D1 by controlling at least the rotational speed of the intermediate shaft M so as to become less than the rotational speed of the input shaft I. Thus, in one preferred embodiment of the present invention, in the case where the rotational speed of the input shaft I is raised in the first control region D1 as in each of the embodiments described above, the rotational speed of the intermediate shaft M is controlled so as to be maintained at a constant value or raised within a range equal to or less than the rotational speed of the input shaft I in the first control region D1.

(8) In each of the embodiments described above, in the drive device 1 to be controlled by the control device 3, the first clutch C1 provided in the speed change mechanism 13 is used as the "second engagement device". However, embodiments of the present invention are not limited thereto. That is, in one preferred embodiment of the present invention, the "second engagement device" is formed by an engagement device provided between the intermediate shaft M and the output shaft O to selectively drivably couples the intermediate shaft M and the output shaft O to each other. For example, in the case where a fluid transmission apparatus such as a torque converter is provided between the rotary electric machine 12 and the speed change mechanism 13, a lock-up clutch of the torque converter may be used as the "second engagement device". In an alternative preferred embodiment of the present invention, a dedicated transfer clutch provided between the intermediate shaft M and the output shaft O, for example, is used as the "second engagement device".

(9) In the embodiments described above, the internal combustion engine control unit 30 includes the internal combustion engine control section 31, the drive device control unit 40 includes the specific starting control section 47 etc., and the internal combustion engine control section 31 and the specific starting control section 47 etc. cooperate to execute the specific starting control. However, embodiments of the present invention are not limited thereto. That is, in one preferred embodiment of the present invention, such functional sections are provided in a single control unit to execute the specific starting control. In an alternative preferred embodiment of the present invention, a rotary electric machine control unit that performs operation control of the rotary electric machine 12, for example, is provided separately from the drive device control unit 40, and the internal combustion engine control unit 30, the rotary electric machine control unit, and the drive device control unit 40 cooperate to execute the specific starting control. In either case, one or two or more control units form the "control device" according to the present invention. The allotment of the functional sections described in relation to each of the embodiments described above is merely illustrative, and a plurality of functional sections may be combined with each other, or a single functional section may be further divided into sub-sections.

(10) Also regarding other configurations, the embodiments disclosed herein are illustrative in all respects, and the present invention is not limited thereto. That is, it is a matter of course that a configuration obtained by appropriately altering part of a configuration not disclosed in the claims of the present invention also falls within the technical scope of the present invention as long as the resulting configuration includes a configuration disclosed in the claims or a configuration equivalent thereto.

The present invention may be suitably applied to a control device for a vehicle drive device including an input member drivably coupled to an internal combustion engine, an intermediate member drivably coupled to a rotary electric machine, an output member drivably coupled to wheels, a first engagement device that selectively drivably couples the input member and the intermediate member to each other, and a second engagement device that selectively drivably couples the intermediate member and the output member to each other.

The invention claimed is:

1. A control device for a vehicle drive device including an input member drivably coupled to an internal combustion engine, an intermediate member drivably coupled to a rotary electric machine, an output member drivably coupled to wheels, a first engagement device that selectively drivably couples the input member and the intermediate member to each other, and a second engagement device that selectively drivably couples the intermediate member and the output member to each other, wherein a difference in rotational speed between engagement members on both sides of the first engagement device is defined as a first differential rotational speed, and a difference in rotational speed between engagement members on both sides of the second engagement device is defined as a second differential rotational speed, the control device comprising:

an electronic control unit that is programmed to perform a specific starting control when a vehicle is started with the rotary electric machine continuously generating electric power from a state in which the rotary electric machine generates electric power with the first engagement device providing no first differential rotational speed and in which the second engagement device transfers no drive force is executed, wherein the specific starting control includes a differential rotational speed control region in which the first engagement device is transitioned from a state in which the first engagement device transfers a drive force while providing no first differential rotational speed to a state in which the first engagement device transfers a drive force while providing the first differential rotational speed, and in which the second engagement device is transitioned from a state in which the second engagement device transfers no drive force to a state in which the second engagement device transfers a drive force while providing the second differential rotational speed.

2. The control device according to claim 1, further comprising:

defining the differential rotational speed control region as a first control region, wherein the specific starting control further includes a second control region which is provided after the first control region and in which the first engagement device is transitioned from a state in which the first engagement device transfers a drive force while providing the first differential rotational speed to a state in which the first engagement device transfers a drive force while providing no first differential rotational speed along with a rise in rotational speed of the output member with the second engagement device providing no second differential rotational speed.

3. The control device according to claim 2, wherein the specific starting control further includes a third control region which is provided between the first control region and the second control region and in which a rotational speed of the intermediate member is maintained at a predetermined value with the rotational speed of the output member rising to gradually decrease the second differential rotational speed.

4. The control device according to claim 3, wherein the specific starting control further includes a fourth control region which is provided between the first control region and the third control region and in which, with the rotational speed of the output member rising, the rotational speed of the intermediate member is raised in accordance with the rise in rotational speed of the output member to maintain the second differential rotational speed at a predetermined target differential rotational speed.

5. The control device according to claim 3, wherein the vehicle drive device further includes an oil pump drivably coupled to the intermediate member to generate, in an actuated state, a supply hydraulic pressure for the first engagement device and the second engagement device, and the rotary electric machine is controlled in the third control region such that the rotational speed of the intermediate member reaches a rotational speed at which the oil pump can secure a supply hydraulic pressure required for both the first engagement device and the second engagement device.

6. The control device according to claim 5, wherein the specific starting control further includes a fourth control region which is provided between the first control region and the third control region and in which, with the rotational speed of the output member rising, the rotational speed of the intermediate member is raised in accordance with the rise in rotational speed of the output member to maintain the second differential rotational speed at a predetermined target differential rotational speed.

7. The control device according to claim 2, wherein
the second engagement device is transitioned in the differential rotational speed control region from a state in which the second engagement device transfers no drive force to a state in which the second engagement device transfers a drive force while providing the second differential rotational speed and further to a state in which the second engagement device transfers a drive force while providing no second differential rotational speed.

8. The control device according to claim 1, wherein
a supply hydraulic pressure for the second engagement device is controlled during the specific starting control so as to vary the first differential rotational speed and the second differential rotational speed in a desired manner.

9. The control device according to claim 1, wherein
operation control of the internal combustion engine and the rotary electric machine is performed so as to transfer drive torque corresponding to the required drive force for driving the vehicle to the wheels, and a supply hydraulic pressure for the first engagement device is controlled so as to maintain the rotational speed of the input member at a predetermined rotational speed with the internal combustion engine outputting a portion of the drive torque to be carried by the internal combustion engine.

10. The control device according to claim 1, wherein
operation control of the internal combustion engine and the rotary electric machine is performed so as to transfer drive torque corresponding to the required drive force for driving the vehicle to the wheels, and a supply hydraulic pressure for the first engagement device is controlled such that a transfer torque capacity of the first engagement device reaches a value equivalent to a portion of the drive torque to be carried by the internal combustion engine.

11. The control device according to claim 1, wherein
the vehicle drive device further includes a speed change mechanism provided between the intermediate member and the output member and including a plurality of engagement devices including a starting engagement device that, in an engaged state, establishes a starting shift speed, and
the control device controls the vehicle drive device in which the starting engagement device serves as the second engagement device.

12. The control device according to claim 11, wherein
operation control of the internal combustion engine and the rotary electric machine is performed so as to transfer creep torque for causing the vehicle to creep to the wheels, and a supply hydraulic pressure for the first engagement device is controlled such that the transfer torque capacity of the first engagement device reaches a value equivalent to a portion of the creep torque to be carried by the internal combustion engine.

13. The control device according to claim 1, wherein
the second engagement device is transitioned in the differential rotational speed control region from a state in which the second engagement device transfers no drive force to a state in which the second engagement device transfers a drive force while providing the second differential rotational speed and further to a state in which the second engagement device transfers a drive force while providing no second differential rotational speed.

14. The control device according to claim 1, wherein
the specific starting control includes a control region in which
a supply hydraulic pressure for the first engagement device is controlled such that the first differential rotational speed reaches a predetermined magnitude,
the rotary electric machine is controlled to a rotational speed matching a target rotational speed decided on the basis of a required amount of generated electric power,
a supply hydraulic pressure for the second engagement device is controlled such that torque transferred to the output member matches a required drive force required to drive the vehicle, and
an internal combustion engine control command for causing the internal combustion engine to output torque matching a sum of electric power generation torque, which is provided to the rotary electric machine to generate the required amount of electric power, and the required drive force is output to an internal combustion engine control section.

* * * * *